United States Patent [19]
Holtslag

[11] Patent Number: 5,569,984
[45] Date of Patent: Oct. 29, 1996

[54] METHOD AND CONTROLLER FOR DETECTING ARC INSTABILITIES IN GAS DISCHARGE LAMPS

[75] Inventor: Antonius H. Holtslag, Eindhoven, Netherlands

[73] Assignee: Philips Electronics North America Corporation, New York, N.Y.

[21] Appl. No.: 366,333

[22] Filed: Dec. 28, 1994

[51] Int. Cl.$^6$ .................................................. H05B 37/02
[52] U.S. Cl. ........................... 315/307; 315/292; 315/308
[58] Field of Search ................................... 315/307, 291, 315/292, 308, 224

[56] References Cited

U.S. PATENT DOCUMENTS

| | | | |
|---|---|---|---|
| 5,225,742 | 7/1993 | Beasley | 315/307 |
| 5,235,255 | 8/1993 | Blom | 315/224 |

FOREIGN PATENT DOCUMENTS

| | | |
|---|---|---|
| 4277495 | 10/1992 | Japan. |
| 4294095 | 10/1992 | Japan. |

OTHER PUBLICATIONS

"High Frequency Ballast For Metal Halide Lamps", P. Caldeira et al., Philips Laboratories, Briarcliff Manor, NY. Dated at least a year before the invention thereof by applicant.

International Rectifier, "Half-Bridge Power Mosfet.IGBT Gate Driver", IR2111, Provisional Data Sheet 6.028 (Jan. 13, 1994).

"High Speed PWM Controller", Unitrode, pp. 4–120 to 4–126. Dated at least a year before the invention thereof by applicant.

"An Electronic Ballast For The MHS Xenon Lamp", Central Development Laboratories, Philips Lighting, (H. Linsses –1988–02–25). Report: Vlc L–VSA 1001/88. Date at least a year before the invention thereof by applicant.

"New Electronic Ballast for HID Lamp", H. Nishimura et al., Matsushita Electric Works, Ltd., Feb. 1987.

"Electronic Ballast For Metal Halide Lamps", H–J. Faehnrich et al., Journal of the Illuminating Engineering Society, Summer 1988, pp. 131–139.

Technical Note Elec. 2002/92 from Central Development Lighting, pp. 1–37. Dated at least a year before the invention thereof by applicant.

"Acoustic Resonances in Cylindrical High–Pressure Arc Discharges", by H. L. Witting, J. Appl. Phys. 49(5), May 1978, pp. 2680–2683.

"Acoustic Resonance Phenomena in Low Wattage Metal Halide Lamps", by J. M. Davenport et al, Journal of IES, Apr. 1985, pp. 633–641.

(List continued on next page.)

Primary Examiner—Robert Pascal
Assistant Examiner—Michael Shingleton
Attorney, Agent, or Firm—Brian J. Wieghaus

[57] ABSTRACT

A method for detecting arc instabilities in a gas discharge lamp by evaluating the deviations of an electrical parameter of the lamp. A method suitable for detecting frequencies at which acoustic resonance induced instabilities occur evaluates the deviations measured over a range of frequencies. Selection of an operating frequency to avoid acoustic resonance is based on an evaluation of the deviations, such as the frequency at which the lowest standard deviation occurs for the electrical parameter measured. Favorably, the electrical parameter used is the conductivity, which provides high insensitivity to noise, is independent of ballast topology, and enables detection of acoustic resonance at levels not visible to the human eye. A control scheme tracks acoustic resonance during run-up of the lamp and quickly selects a favorable operating frequency after the lamp reaches steady-state. Resonance detection is achieved both during run-up and the steady state substantially without inducing visible flicker. The method and ballast employ universal techniques suitable for operating HID lamps of different types, wattages and manufacturers despite the occurrence of acoustic resonance/arc instabilities among these lamps over a fairly broad frequency range.

36 Claims, 15 Drawing Sheets

OTHER PUBLICATIONS

"Study of HID Lamps With Reduced Acoustic Resonances", by S. Wada et al, Journal of the Illuminating Engineering Society, Winter, 1987, pp. 166–174.

"Acoustic Resonances in High Frequency Operated Low Wattage Metal Halide Lamps", by J. W. Denneman, Philips Journal of Research, vol. 38, Nos. Apr. 5, 1983, pp. 263–272.

"An Autotracking System for Stable HF Operation of HID Lamps", by F. Bernitz, pp. 251–252. Dated at least a year before the invention thereof by applicant.

Journal of the Illuminating Engineering Society, Summer 1991, pp. 95–96.

METHOD AND CONTROLLER FOR DETECTING ARC INSTABILITIES IN GAS DISCHARGE LAMPS

CROSS REFERENCE TO RELATED APPLICATION

This application relates to U.S. application Ser. No. 08/366,337, filed concurrently herewith, of Paulo Caldeira, Larry Bourdillon, Antonius Holtslag and Jinrong Quian entitled "Controller For A Gas Discharge Lamp With Variable Inverter Frequency And With Lamp Power And Bus Voltage Control", which claims a ballast which ensures that the power delivered to the lamp remains substantially constant despite changes in the inverter operating frequency.

BACKGROUND OF THE INVENTION

1. Field of the Invention

The invention relates to a method of operating a high pressure gas discharge lamp at high frequencies, and in particular, to detecting acoustic resonances and selecting an operating frequency to avoid visible flicker during lamp operation. The invention also relates to a lamp controller for controlling lamp operation according to this method.

2. Description of the Prior Art

High pressure discharge (HID) lamps, such as mercury vapor, metal halide and high pressure sodium lamps, are typically operated with a magnetic ballast at or slightly above normal power line frequencies, e.g. 60–100 Hz. It would be desirable to provide an electronic ballast which operates HID lamps at high frequencies at above about 20 kHz. High frequency ballasts are becoming increasingly popular for low pressure mercury vapor fluorescent lamps. The high frequency operation permits the magnetic elements of the ballast to be reduced greatly in size and weight as compared to a conventional low frequency magnetic ballast. High frequency operation also provide substantial increases in lamp efficacy on the order of 10–15% for fluorescent lamps because of reductions in cathode drop. Similar reduction in size and weight would be desirable for HID lamps, especially for lower wattage metal halide lamps used for shop and track lighting, because it would provide greater flexibility in designing aesthetically pleasing fixtures for such uses. Lamp efficacy would also increase a few percent, though not nearly as much as for fluorescent lamps.

A major obstacle to the use of high frequency electronic ballasts for HID lamps, however, is the acoustic resonances/arc instabilities which can occur at high frequency operation. Acoustic resonances, at the minimum, cause flicker of the arc which is very annoying to humans. In the worst case, acoustic resonance can cause the discharge arc to extinguish, or even worse, stay permanently deflected against and damage the wall of the discharge vessel, which will cause the discharge vessel to explode.

The frequencies at which acoustic resonance occurs depends on many factors, including the dimensions of the arc tube (i.e., length, diameter, end chamber shape, the presence or absence of a tubulation), the density of the gas fill, operating temperature and lamp orientation. For high frequency ballasts, the operating frequency of the lamp current $f_I$ will generally be selected to be above the audio range ($f_I$>20 kHz) but may be lower. For the typical ballast operating with (distorted) sine waves, the power frequency is twice the frequency of the current, so $f_P$ will be greater than 40 kHz. The arc tubes, or discharge vessels, of high pressure sodium lamps and some of the newer metal halide lamps are ceramic and cylindrical in shape. The arc tubes of mercury vapor and metal halide lamps are made of quartz glass, typically with a cylindrical body and rounded end chambers. The power frequencies at which longitudinal acoustic resonance occurs for these generally cylindrical arc tubes can be approximated from the formula:

$$f_n = n \left[ \frac{\bar{c_L}}{2L} \right], n = 1,2,3,\ldots \quad (1)$$

where L stands for the typical length of the arc tube, n denotes an integer number, $\bar{c_L}$ denotes an averaged speed of sound in the length direction of the burner and equals approximately 450 m/s. The radial-azimuthal modes are given by:

$$f_{lm} = \alpha_{lm} \frac{\bar{C_r}}{2\Pi R} \quad (2)$$

where $\bar{C_r}$ denotes an averaged speed of sound in the radial direction, R denotes the typical radius of the arc tube, and $\alpha_{lm}$ denotes the zeros of the first derivative of the Bessel functions.

The complete resonance spectrum $f_{lmn}$ is calculated from:

$$f_{lmn} = \sqrt{f_{lm}^2 + f_n^2} \quad (3)$$

If the length of the arc tube is substantially larger than the radius, the frequencies at which flicker occurs can be estimated from formula (1) for longitudinal resonant frequencies.

For the specific case of a 100 W metal halide lamp with an arc tube length of 15 mm, for example, the lowest longitudinal resonant frequencies are expected to occur at power frequencies of 15 KHz. Therefore, higher order resonances will occur at power frequencies $f_P$ above 40 KHz, which correspond to current frequencies $f_I$ above the audible range.

Thus, the resonant frequencies can be approximated by calculation and/or observed through experiments by operating the lamps at varying frequencies and visually observing the resulting flicker. For a specific lamp type under specific operating conditions, an operating frequency can be selected at which visible flicker does not occur and a ballast designed to operate the lamp at this pre-selected frequency. However, the ballast would be limited to a specific wattage lamp of a specific manufacturer. Furthermore, changing operating conditions, such as changing environmental conditions or lamp blackening over life, which would alter the operating temperature and/or pressure, could change the resonant frequencies so that resonance occurs at the pre-selected ballast operating frequency. Alternatively, especially in the case of quartz glass arc tubes where dimensional control is difficult, even lamps from the same manufacturer would have different resonant points so that it is possible that a considerable percentage of lamps would flicker at the selected ballast operating frequency. Besides not being fault free, manufacturing a ballast for a specific lamp of a certain manufacturer is expensive in view of its limited market and is inflexible for the user. Accordingly, it would be desirable to provide a ballast for a broader range of lamps which senses arc instabilities during operation and selects the operating frequency to avoid arc instabilities due to acoustic resonance.

The article "An Autotracking System For Stable Hf Operation of HID Lamps", F. Bernitz, Symp. Light Sources, Karlsruhe 1986, discloses a controller which continuously varies the lamp operating frequency about a center frequency over a sweep range. The sweep frequency is the frequency at which the operating frequency is repeated through the sweep range. The controller senses lamp voltage to evaluate arc instabilities. A control signal is derived from the sensed lamp voltage to vary the sweep frequency between 100 Hz and some KHz to achieve stable operation. However, this system has never been commercialized.

JP 4-277495 (Kamaya) discloses a ballast which senses the impedance of the discharge lamp. If the impedance of the lamp is below a specified level, the ballast reduces high frequency oscillating components in the lamp current. A disadvantage of this design, however, is that the specified level is fixed, and as noted previously, the resonant frequencies in reality vary from lamp to lamp. Additionally, even though the high frequency components are reduced in the lamp current, there is no guarantee that operation will not shift to another resonant frequency at which arc instabilities occur.

Accordingly, it is an object of the invention to provide a method of detecting arc instabilities in gas discharge lamps, which is universally applicable regardless of lamp power, type, dimension, or physical or chemical composition. It is another object to provide such a method which may be implemented in a wide range of ballast topologies.

It is yet another object to provide a method of operating HID lamps at high frequencies to detect and avoid frequencies at which acoustic resonance occurs for a broad range of lamps, or at least lamps.

It is still another object to provide a lamp controller, or ballast, which implements this method.

SUMMARY OF THE INVENTION

In the method according to the invention, arc instabilities are detected by evaluating the deviations in an electrical parameter of the lamp. The lamp operating parameters can then be changed based on an evaluation of the deviations to avoid further arc instabilities. The invention is based on the recognition that arc instabilities are accompanied by deformations in the arc which change its length, which in turn vary the electrical parameters of the lamp, such as the voltage, current, conductance, or inversely, the impedance of the lamp. Operating frequencies at which arc instabilities occur caused by acoustic resonance are determined by evaluating the deviations determined at each of a plurality of operating frequencies.

An embodiment of the invention particularly suited for detecting the frequencies at which arc instabilities occur due to acoustic resonance includes the steps of: operating the gas discharge lamp at a plurality of frequencies; sensing and taking a plurality of samples of a selected electrical parameter at each frequency; calculating a deviation, at each of said plurality of frequencies, of the samples of the electrical parameter taken at each frequency; evaluating the calculated deviations; and selecting a lamp operating frequency based on the evaluation of the deviations. Favorably, the deviations are evaluated to determine the frequency having the lowest deviation in the sampled lamp parameter and the operating frequency is set at this frequency. Iterating the above-steps with different frequency spans and scan rates enables the frequencies at which the global and then local minimums in arc deflections occur to be rapidly and accurately determined.

Favorably, the lamp parameter sensed is the conductance or the impedance, which in general permits the accurate detection of much smaller arc deflections than is possible with either voltage or current alone. By evaluating deviations in the conductance, it has been found that arc deflections due to acoustic resonance can be sensed at levels which are not perceptible to the human eye. The use of conductance or impedance, which are ratios of the lamp voltage and current, permit simpler sampling techniques than is possible with either the voltage or current alone. Additionally, use of the conductance or impedance overcomes the problems associated with sensing voltage or current alone, which generally does not work properly. For example, voltage detection alone is sensitive to line variations such as surges, mains dip and other external conditions.

According to another embodiment, the deviation detected is the standard deviation. This has the advantage that all deviations of the arc detected in a sampling interval contribute to the effective deviation rather than, for instance, only the maximum deviation detected in a sampling interval.

In another embodiment, the detection of the frequencies at which acoustic resonance occurs is accomplished by conducting a symmetrical sweep of frequencies about a center frequency, the sweep including a portion with a set of frequencies wherein the frequencies are increasing and a portion including the same set of frequencies wherein the frequencies are decreasing. It was discovered that there is hysteresis in the deflection response of the arc, so that the arc deflections at any given frequency are dependant not only on the sweep rate at which the frequencies are changed but also on whether the frequencies are decreasing or increasing. By measuring the deviations at each frequency in a symmetric manner, i.e. sampling at each frequency both when the frequencies are increasing and when they are decreasing and at the same sweep rate, the effects of hysteresis are eliminated and detection of the frequencies at which resonance occurs is improved.

Favorably, the detection of the resonance-free frequencies and selection of the operating frequency are conducted during a run-up stage of lamp operation, between ignition of the lamp and steady-state operation. In the run-up stage the frequencies at which acoustic resonance occurs rapidly changes due to the increasing gas pressure and temperature of the lamp. While this does not immediately appear to be a good environment for detecting the frequencies having no acoustic resonance, it has been found that the frequency sweep and iteration speeds can be selected so that a controller can home-in on a frequency with a local minimum in the deviation of arc deflection and track this minimum through the end of run-up. This has the advantage that when the run-up period is over and the lamp has reached full light output, a desirable operating frequency has already been selected and the lamp can be operated with no visible flicker as early as the end of the run-up period. This technique has been found to work well despite the lower possibilities of developing arc instabilities during run-up due to the lower gas pressures and temperatures. Favorably, the detection of deviations in the arc continues during steady state operation so that adjustments can be made in the operating frequency to account for small changes in the gas fill pressure and/or temperature caused, for example, by environmental effects. For control in the steady state, the span and sweep rate of the frequency sweeps are selected so that visible flicker is avoided.

Random deflections in the arc can occur due to effects such as arc jumps at the electrode or flare-ups caused by droplets of the fill material in the lamp discharge vessel suddenly entering the arc stream. If these random events are not accounted for, they would cause errors in the detection of the standard deviations during the frequency sweep and cause operation at a new frequency corresponding to a false minimum in the standard deviation. In order to avoid this, in yet another embodiment, each frequency sweep is conducted twice consecutively and operation at a new center frequency is begun only if the difference between the respective set of deviations measured in the two iterations are within a prescribed level.

The lamp controller, or ballast, according to the invention includes a high frequency inverter for operating an HID lamp within a selected frequency range. The inverter is responsive to a control signal supplied by an arc instability controller which implements selected steps of the above-described method. In an embodiment, the arc instability controller includes a microprocessor programmed with software to carry out the selected method steps.

In contrast to known commercially available systems, the method and ballast employ universal operating principles suitable for operating HID lamps of different types, manufacturers and wattages despite the occurrence of acoustic resonance among these lamps over a fairly broad frequency range.

These and other objects, features, and advantages of the invention will become apparent with reference to the drawings and following detailed description, which are illustrative only, and not limiting.

BRIEF DESCRIPTION OF THE DRAWINGS

FIG. 6b illustrates the global minimum for weak resonances, in the standard deviation of the conductance shown in FIG. 6a;

DESCRIPTION OF THE PREFERRED EMBODIMENTS

Figure 1:
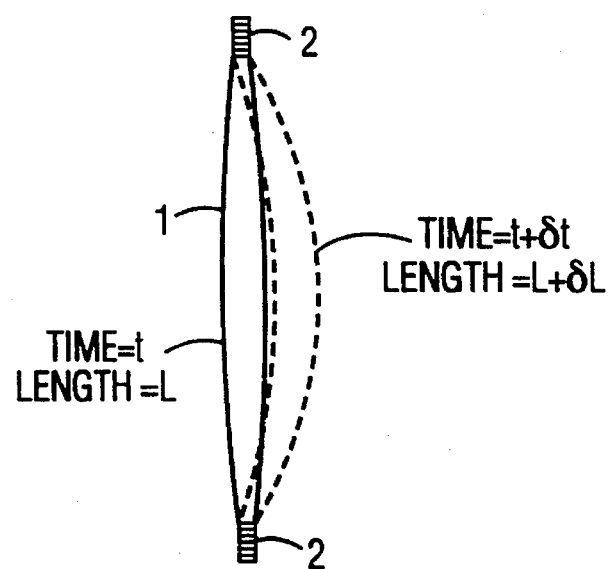
FIG. 1 illustrates the displacement of a flickering discharge arc.

FIG. 1 illustrates a discharge arc 1 between a pair of discharge electrodes 2 of an HID lamp in a vertical operating position. The arc tube is not shown for the purpose of clarity. The arc is subject to flicker induced by acoustic resonance. The center position represents the position of the arc at an arbitrary time t at which it has a length L. The offset position shown in dashed lines represents the deflected position of the arc at a time t+δt, from which it is seen that the arc has a longer length L+δl. The different lengths of the undeflected and the deflected arc cause the electrical lamp parameters, such as voltage, current, conductance and impedance to have different values in each of these positions and is the major cause of change in these electrical parameters. Thus, acoustic resonance causes changes in the arc length and consequently changes in these electrical parameters. Detection of changes in these parameters therefore gives the possibility of detecting acoustic resonance electrically and of developing a scheme to evaluate at which frequencies resonance and arc deflection occur and of controlling the operating frequency of the lamp to operate at frequencies at which visible flicker does not occur.

It should be noted that in some situations satisfactory control may be obtained by detecting deviations in only the lamp voltage V or the lamp current I. However, using the impedance and, in particular, the conductance G=I/V has numerous advantages. The change in conductance or impedance is always equal to or higher than the change in the current or voltage only. The signal-to-noise ratio is typically 20 dB higher in the conductance or the impedance than in the current or voltage alone. By measuring both voltage and current simultaneously to calculate their ratio for the impedance or conductance, noise contributions, for example from a power line, in each of these signals cancel. If the voltage or current were used alone, these noise signals would remain. These advantages enable detection of very small deflections in the arc which are not noticeable to the human eye and which in practice are typically not detectable using lamp voltage or current alone. Additionally, control based on conductance or impedance is independent of circuit topology of the lamp controller whereas control based on voltage or current alone is topology dependent. Finally, when both voltage and current are sensed simultaneously to calculate impedance or conductance a much simpler sampling scheme may be used than is possible with sampling voltage or current alone.

While detection of the impedance or conductance share the above advantages, detection of the conductance is preferred for the reason that, before, during and immediately after ignition, the lamp current is zero or very small and the lamp starting voltage is very high. During these instances, the impedance R=V/I would be infinity or very high. Conversely, the conductance G=I/V is zero or small during these periods and can always be calculated. Using the conductance also makes the method/ballast less sensitive towards the lamp. For example, if a lamp is replaced or substituted with a different lamp type, V and I will change but G=V/I will remain in the same relative range. With the conductance, this control can be considered even more universal, i.e., can be applied to a variety of lamps of different type, make, and wattage. Accordingly, throughout the remainder of the detailed description the embodiments will be described with reference to detection of the conductance, and those of ordinary skill in the art will appreciate that the impedance could be substituted in the following embodiments so long as evaluation in the first few seconds after lamp ignition is avoided. Additionally, those of ordinary skill will appreciate that, where the signal strength of the voltage or current is sufficiently high to obtain satisfactory control, sampling of the voltage or current alone may be used instead of the conductance.

The method and controller according to the invention employs several phases of control, each of which depends on the sampling of conductance at a plurality of frequencies and the calculation of a selected deviation at each frequency. Accordingly, a favorable conductance sampling and deviation calculation technique will be described prior to discussing the phases of control.

Calculation of Conductivity (Sampling)

The task is to calculate the conductance g(t) from the rapidly changing voltage and current. For an HID lamp operating on a typical high frequency ballast with distorted sine waves, the lamp voltage is a periodic alternating function $V(t)=V(t+p)$ with a period $p=2\pi/\omega$. The current frequency $f_I$ and thus the voltage frequency are above the audible range, i.e. above 20 kHz, so $p<50$ μs. The current by definition is given by $I(t)=g(t)V(t)$. The conductivity g(t) is only a slow changing positive function of time, almost constant during an appropriately chosen sample time T. At least two samples are taken in the period p (to avoid detecting small signals only), and during a certain time T>p (on the order of ms) a total of N samples are taken. By definition, we will consider the values G:

$$G = \frac{<|I|>}{<|V|>} \quad (4)$$

where in general $<f>$ denotes by definition the averaged value of observed values $f_i$, i=1, 2, ... N:

$$<f> = \frac{1}{N} \sum_{i=1}^{N} f_i \quad (5)$$

Absolute values in the sums for the conductivity calculation are taken to avoid a sum equal to zero, and also to obtain a maximum value of the sum (an alternative is to take $G=[<I^2>/<V^2>]^{1/2}$). Substitution of the definitions and the equation for the current leads too:

$$G = \frac{\sum_{i=1}^{N} |I_i|}{\sum_{i=1}^{N} |V_i|} = \frac{\sum_{i=1}^{N} g_i |V_i|}{\sum_{i=1}^{N} |V_i|} \approx \frac{<g> \sum_{i=1}^{N} |V_i|}{\sum_{i=1}^{N} |V_i|} = <g>, \quad (6)$$

while as assumed the values $g_i$ are almost constant during the sample time T. When the current and voltage are sampled at the same time the two summations over $V_i$ cancel. This can be accomplished very simply in practice with a simultaneous sampling board. It is not necessary to sample an integer number of periods p, because the summations are always over the same samples $V_i$.

To detect acoustic resonances, the general scheme is to operate the gas discharge lamp at a plurality of frequencies, at each frequency calculate the conductance a plurality of times by taking a plurality of simultaneous samples of lamp voltage and lamp current, and for each frequency calculate the standard deviation of the conductances taken at that frequency. This procedure is notionally given by the following equations:

$$G_{jk} = \frac{\sum_{i=1}^{N_{IV}} |I_{ijk}|}{\sum_{i=1}^{N_{IV}} |V_{ijk}|}, j=1,2,\ldots N_G; k=1,2,\ldots N_F \quad (7)$$

$$G_k = \frac{1}{N_G} \sum_{j=1}^{N_G} G_{jk}, k=1,\ldots N_F,$$

$$\sigma_k^2 = \frac{1}{N_G} \sum_{j=1}^{N_G} (G_{jk} - G_k)^2 = \frac{1}{N} \sum_{j=1}^{N} G_{jk}^2 - G_k^2 \quad (8)$$

By taking at each frequency $f_k$ a number of $n_{IV} \times n_G$ samples (i=1 to i=$n_{IV}$; j=1 to j=$n_G$), a standard deviation $\sigma_k$ is determined. All samples used to calculate $\sigma_k$ are collected at the frequency $f_k$. Then the next frequency $f_k$ is selected and the sampling and calculation is repeated. The frequency having the smallest standard deviation is the frequency with the lowest arc deflection caused by acoustic resonance and the frequency(s) with the highest standard deviation(s) are the frequencies with the largest arc deflection.

Figure 2:
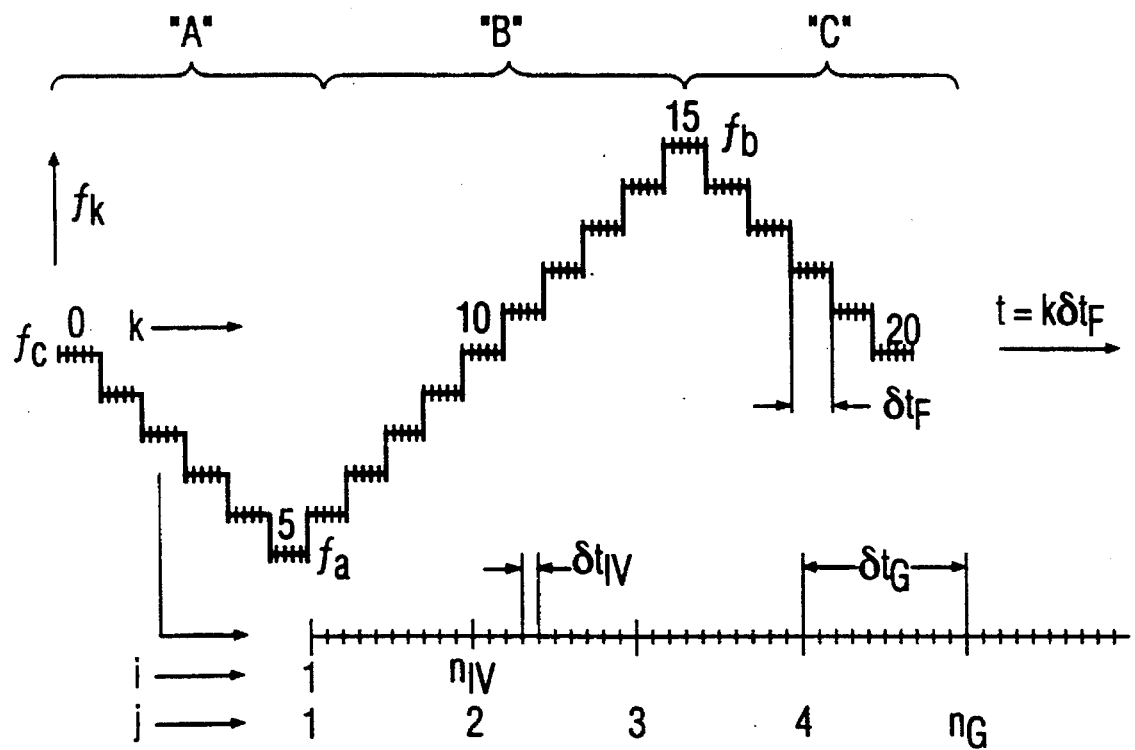
FIG. 2 illustrates a favorable sampling technique for measuring the standard deviation in conductance within a frequency window.

A sampling scheme employing these equations is illustrated in FIG. 2. A symmetric frequency sweep over a sequence of frequencies (k=0,1,2 ... 20) is conducted. At each frequency $f_k$, a sequence (j=1,2 ... $n_G$) of conductivities $G_j$ are determined by measuring for each conductivity $G_j$ simultaneously selected samples $I_i$ and $V_i$. This is illustrated in FIG. 2 for the frequency of k=2. The frequency sweep starts at a center frequency $f_c$, decreases (portion A) to a minimum frequency $f_a$, increases (portion B) to a maximum frequency $f_b$, and then decreases again (portion C) to the center frequency $f_c$. Portion B has the same set of frequencies as portions A and C combined. It is desirable to sample the conductance with the frequency both increasing and decreasing because of hysteresis in the deflection response of the arc. By conducting the frequency sweep in this manner, the effects of hysteresis are eliminated. The span of the frequency sweep is the difference between $f_a$ and $f_b$. The scan rate is the rate at which the frequencies $f_k$ are changed.

In equations 7 and 8, the indices i, j and k used at the current and voltage indicate that in principle these are three dimensional arrays. For implementation in a lamp controller it would be advantageous to avoid having to provide memory for storing these values. For the general case, the standard deviation is defined by:

$$\sigma^2 = \frac{1}{N} \sum_{i=1}^{N} (x_i - \bar{x})^2 \quad (9)$$

However, after squaring the term after the summation in equation 9 and substituting (9a), $$\text{where } \bar{x} = \frac{1}{N} \sum_{i=1}^{N} x_i. \quad (9a)$$

equation 9 becomes:

$$\sigma^2 = \frac{1}{N} \sum_{i=1}^{N} x_i^2 - \left( \frac{1}{N} \sum_{i=1}^{N} x_i \right)^2. \quad (10)$$

Figure 3:
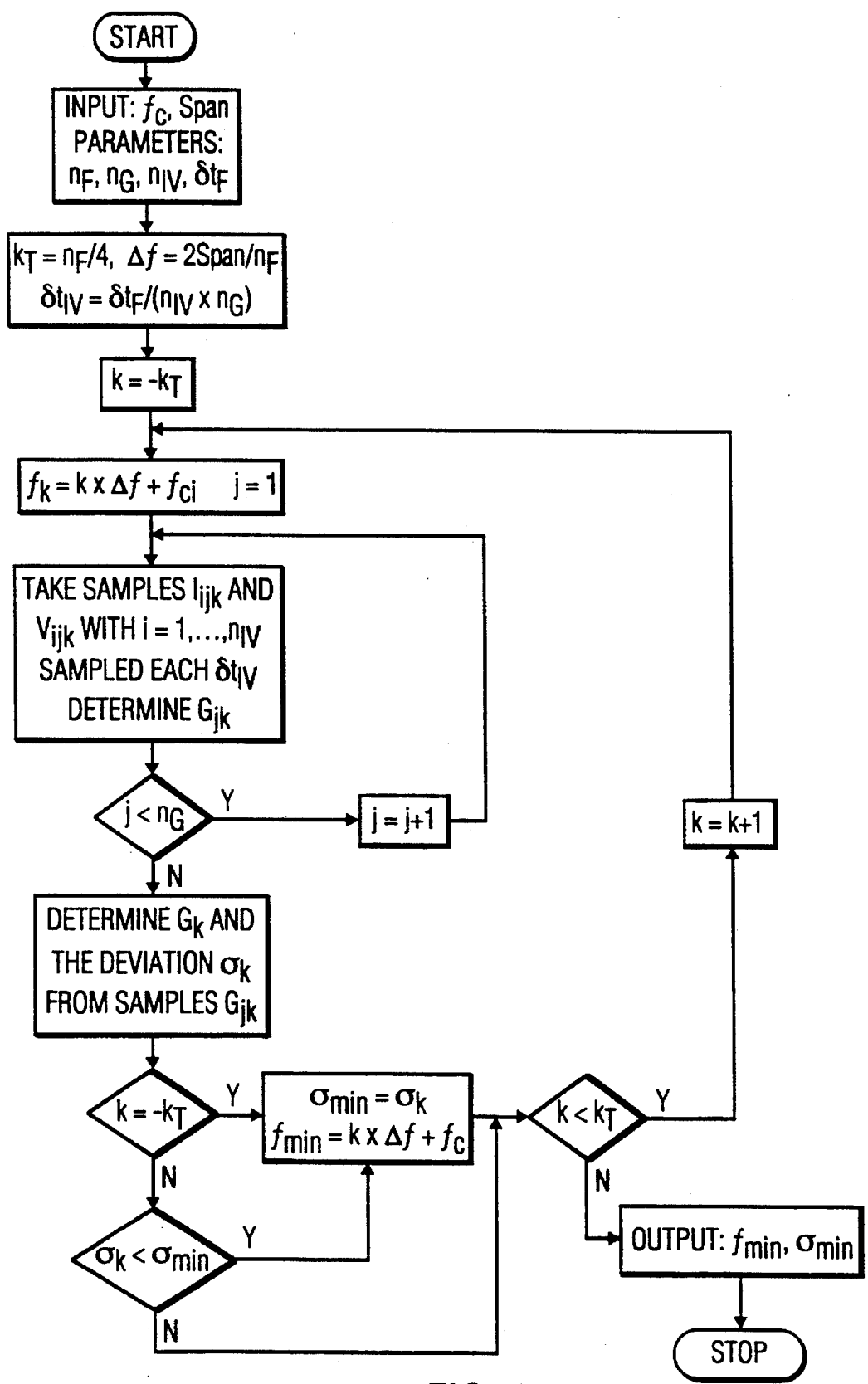
FIG. 3 is a flowchart of the Open Loop Control for finding the minimum flicker in a selected frequency interval and calculating the standard deviation $\sigma_k$ from samples $G_{jk}$, according to one embodiment.

By using equation 10 (where $x_i = G_k$), the calculation of a standard deviation $\sigma_k$ of the conductances $G_k$ sampled at a frequency $f_k$ can be carried out in software without having to store all of the current and voltage samples for each sampling point in an array. A flowchart for accomplishing this while carrying out the frequency sweep shown in FIG. 2 is shown in FIG. 3.

Figure 4:
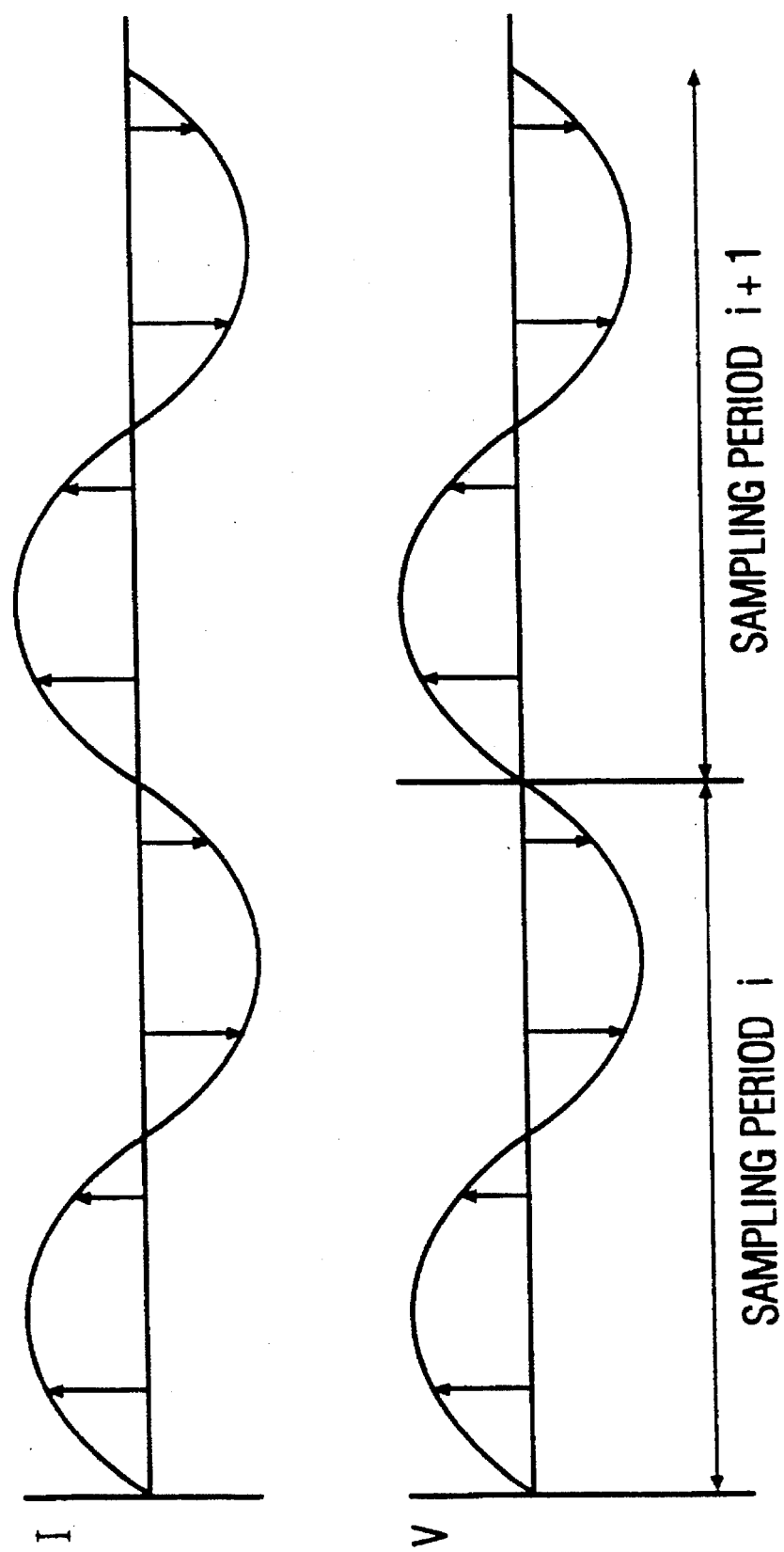
FIG. 4 illustrates the simultaneous sampling of voltage and current for calculating conductance.

By using the conductance, the sampling scheme for determining the standard deviations is greatly simplified as compared to using the standard deviation in the voltage or the current alone. This is illustrated in FIG. 4, which shows a voltage V and current I waveform with two sample periods i and i+1, with the arrows representing the location and amplitude of the samples taken. In FIG. 4, the samples in period i are taken at different locations with respect to the phase than in period i+1. Thus, $\Sigma |I|$ or $\Sigma |V|$ in period i is not the same as in period i+1, so there would be an error in the calculation of the standard deviation. If only the voltage V or current I are sampled, the sampling must be triggered at the same instant in the waveform of the voltage or current for the standard deviation to be accurate. This would entail additional sensing and triggering devices in a ballast controller employing this technique. Such triggering would also introduce error into the standard deviation calculation. By using the conductance, the voltage and current need only to be sensed simultaneously. The values of the simultaneously sensed current and voltage are normalized in the ratio I/V which defines the conductance so the instant at which the samples $$G_i = \frac{\Sigma |I|}{\Sigma |V|}$$

are taken with respect to the sensed waveform is irrelevant. This simplifies the sampling scheme and its implementation in a ballast controller.

The deflection of the arc between the electrodes due to a force, induced for instance by an acoustic resonance, can be described by a second order differential equation in time. A typical time constant of $\tau=50$ ms describes the time to achieve a certain deflection. This time was determined by deflecting the arc in a 100 W metal halide lamp with an external electromagnetic force of known value and duration from a coil positioned around the lamp. The equivalent force on the arc caused by an acoustic resonance can be described by $F=F_0 \sin(2\pi\Delta ft)$. With this force, the highest response is observed at a frequency of $\Delta f=3$ Hz. At higher frequencies of the force, the frequency response drops by 40 dB/decade. Depending on the strength of the force on the arc the deflection will be either big or small. In ballasts which use a sine wave current to drive the lamp, some resonances can deflect the arc against the wall of the arc tube. Such a resonance is defined herein as a strong resonance. All other resonances not able to deflect the arc against the wall are defined as weak resonances. In order to provide a control scheme to prevent a strong resonance from driving the arc to the wall, the control should respond much faster than 50 ms and apply a different operating frequency at which strong resonances do not occur in a time much less than 50 ms. In measuring flicker due to weak resonances, a time at least on the order of 150 ms should be used. Strong resonances are important in that deflection of the arc to the wall may cause lamp explosion. Weak resonances are important in that they cause flicker of the arc which is very annoying to humans.

Lamp Characteristics

An understanding of the run-up of the lamp, i.e. the first few minutes after lamp ignition, is important in developing a control scheme for the lamp. This is illustrated in Table I below.

TABLE I

| increasing temperature $\longrightarrow$ changing frequencies | | |
|---|---|---|
| $t_i = 0$ s | $t_o \approx 30$ s | $t_{steady} \approx 120$ s    t |
| (T = 300K) | increasing pressure | (T ≈ 5000K) |
| (p = 0.3 bar) | decreasing damping | (p ≈ 15 bar) |
| low pressure | | high pressure |
| ↓ | ↓ | ↓ |
| no acoustic resonances | increasing intensity of acoustic resonances | acoustic resonances |

Before ignition, the pressure in a typical 100 W metal halide lamp equals about 0.3 bar. During run-up, the operating pressure increases towards the steady state operating pressure of about 15–20 bar, typically within about 120–200 seconds after ignition. The damping in the fill gas, i.e. the resistance to induce an acoustic resonance, and therefore the change in position of the arc, is inversely proportional to the pressure, so the damping decreases by a factor of about 50 during run-up. Consequently, the intensity of acoustic resonances and arc instabilities increases. During about the first 30 seconds after ignition no acoustic resonances occur because it is still essentially a low pressure discharge lamp. Thus, detection of resonance and flicker through measurement of the conductance can not feasibly take place in this time period. During further run-up, between $t_o$ at $\approx 30$s and $t_{steady}$ at $\approx 120$s, the gas content, and therefore the resonant frequencies, rapidly change due to increasing lamp temperature $T_L$, lamp fill pressure, speed of sound $\bar{c}_L$ and entry of the metal halides into the arc stream. The location of the resonant frequencies will not stabilize until the lamp has reached the steady state at $t_{steady}$.

If a ballast which could operate HID lamps over a broad range of rated Wattages (20–400 W, for example) were desired, detection of deviation in the conductance could be used to locate for any HID lamp an operating frequency which would be free of visible flicker induced by acoustic resonance. In practice, such a ballast is not commercially practical because voltage across and current through electronic devices determines cost; so each lamp is operated the most cost effectively by a ballast designed for that maximum power. It is sufficient, and would be a great improvement over the art, if a high frequency ballast could operate lamps having arc tubes of similar shape (e.g. from different manufacturers) and a narrow range of wattages. A favorable embodiment of the invention is based on the pre-selection of a relatively narrow window of operating frequencies at which strong resonances (that cause deflection of the arc against the arc tube wall) do not occur for the intended range of lamps desired. After lamp ignition, the method and controller implementing this method operate within the pre-selected window to home-in on a frequency at which visible flicker caused by weak resonances does not occur for the specific lamp being controlled. Additionally, since environmental conditions or other factors may change the acoustic resonance nodes of the lamp, the method and controller continues detection and monitoring throughout lamp operation to prevent the lamp from wandering into acoustic resonance.

Figure 5A:
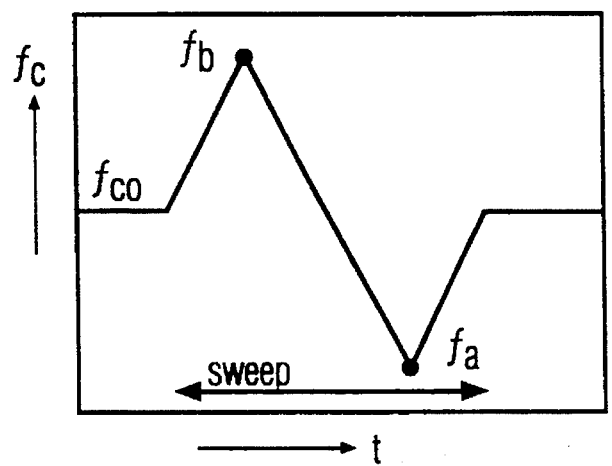
FIG. 5a illustrates a global frequency sweep for detecting strong resonances.

The above techniques will be explained in general terms with reference to FIGS. 5–7. These figures illustrate the detection of strong resonances and of weak resonances, both during run-up and during the steady state. A specific control algorithm carrying out a favorable embodiment employing these techniques will then be discussed.

Detection of Strong Resonances: Window Pre-selection

The frequencies $f_{lmn}$ at which acoustic resonance occurs are at a plurality of nodes given by Equation 3. These frequencies can be confirmed through experiment by varying the operating, or center, frequency $f_c$ over a broad range $f_a$ to $f_b$ (see FIG. 5a) at a plurality of frequencies $f_k$ and by calculating the standard deviation of the conductances by taking a plurality of simultaneous samples of lamp voltage and current at each frequency $f_k$, as discussed above with respect to Equations 7, 8, 10 and FIG. 2. From this scanning, the frequencies at which strong resonances occur will become apparent because these frequencies will have the highest standard deviation, and can also be visually observed. These frequencies are shown as dots in FIG. 5b.

Figure 5B:
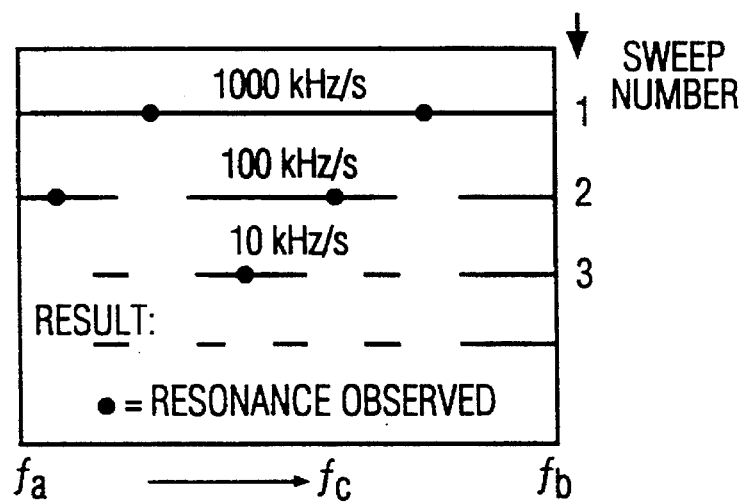
FIG. 5b illustrates the location of strong resonances and of permissible operating windows which are free of strong resonances.
Figure 5C:
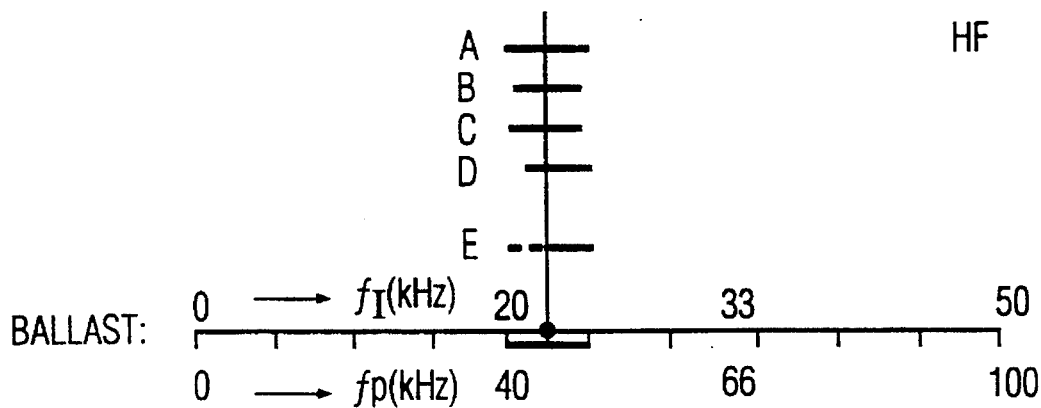
FIG. 5c is a chart of the permissible operating windows at which strong resonances do not occur for several different 100 W metal halide lamps A, B, C, D, E from different manufacturers.

In order to avoid damage to the arc tube, strong resonances should be detected by an iterative procedure, as illustrated in FIG. 5b. Because of damping, and the second order deflection response of the arc, arc deflection will be the least at high scan rates and the greatest at low scan rates. If a low scan rate is used initially, there is the danger that the arc will be deflected against the arc tube wall sufficiently long to damage it. Therefore, the first frequency sweep should use a high scan rate of about 1000 kHz/s and will reveal frequency windows at which the strongest resonances are observed without damaging the arc tube. These frequencies should be avoided in further scans. The frequency sweeps should be repeated with a successively lower scan rates of, for example, 100 kHz/s and 10 kHz/s. This will reveal the frequencies at which the strongest resonances occur. Windows of frequencies, having a span of a few thousands of hertz, at which strong resonances do not occur will also be observed and are illustrated in FIG. 5b, in the line labelled "result", as solid lines. These windows are the frequencies at which the lamp should be operated to avoid strong resonances.

This procedure is either used in the lamp controller, or by the ballast designer in pre-selecting a wide frequency window for the lamps intended to be controlled by the ballast. If done by the ballast designer, this procedure should be repeated for each lamp that the ballast is intended to operate. A common window may then be selected in which each of the intended lamps can be operated by the same lamp controller without the occurrence of strong resonances. A chart of the permissible operating windows for several 100 W metal halide lamps A–E, each of a different manufacturer, are shown as solid lines in FIG. 5c. The common permissible operating window in this chart is at 20–25 kHz.

It is not necessary for the pre-selected window to be completely free of strong resonances. The danger associated with strong resonances can be avoided using increased sampling or the technique discussed under the heading "wall deflections", for example. However, the pre-selected range should have some, even if quite narrow, stable regions.

Detection of Weak Resonances

Figure 6A:
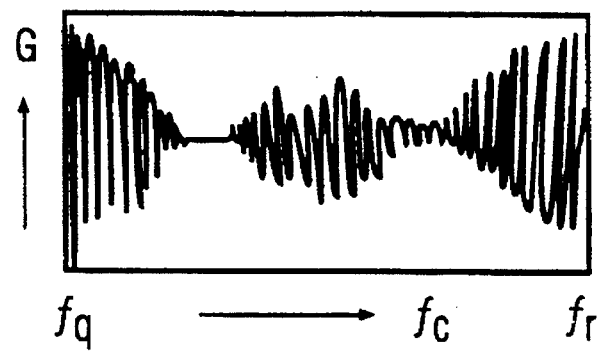
FIG. 6a illustrates the deviation in conductance representing weak resonances over a range of frequencies within an allowable window of FIG. 5c.
Figure 6B:
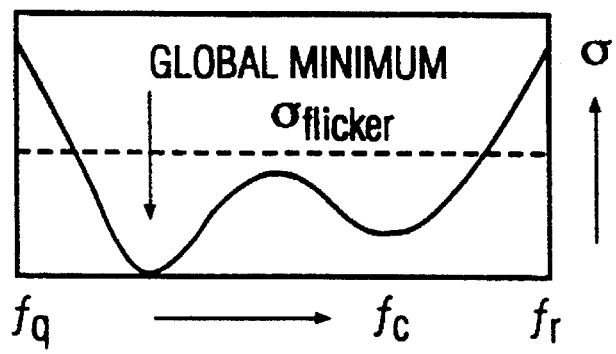
Figure 7A:
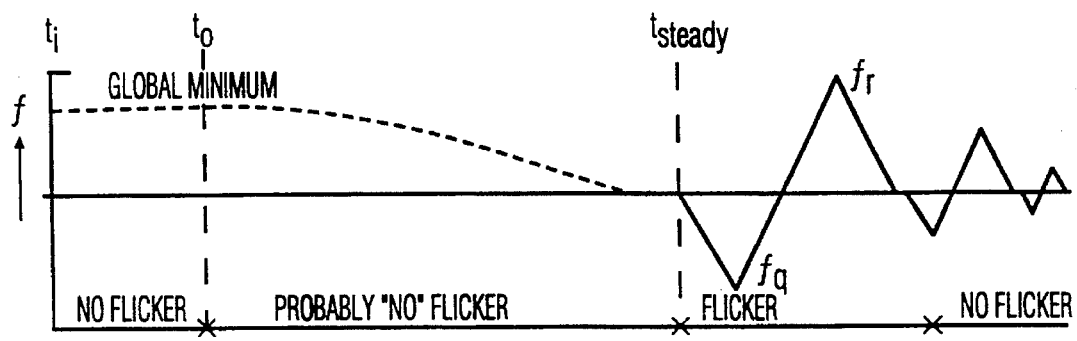
FIGS. 7(a), 7(b) and 7(c) illustrate three control options for detecting the global minimum in the standard deviations for weak resonances.
Figure 7B:
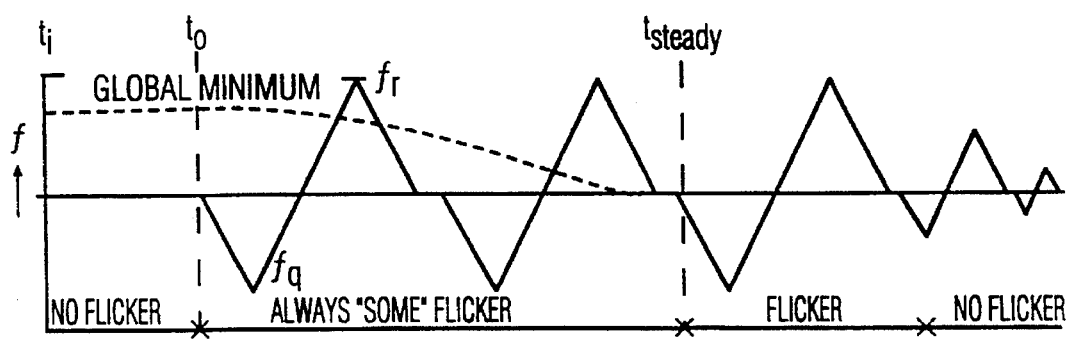

Once a window free of strong resonances is selected, the lamps should be operated only within this pre-selected window. Again, the general scheme is to vary the frequencies within the selected window to detect those frequencies at which weak resonances, which cause visible flicker, do not occur. Preferably, the frequency sweep and sampling technique shown in FIG. 2 is used to vary the center frequency between $f_q$ and $f_r$ as shown in FIG. 6(a), which represent, respectively, the boundaries of the pre-selected window of FIG. 5c, for example $f_q$=20 kHz and $f_r$=25 kHz in this specific case of 100 W metal halide lamps. The goal is find the global minimum in the standard deviation, within the window $f_q$ to $f_r$, as shown in FIG. 6(b).

Several control options are possible. In a first option illustrated in FIG. 7a, the lamp is ignited at time=$t_i$, operated at a center frequency midway between $f_p$ and $f_q$ and allowed to warm-up to steady state, beginning at $t_{steady}$, where the location and intensities of the resonant frequencies are relatively stable. The frequency sweep and sampling technique of FIG. 2 is then performed beginning at $t_{steady}$ and the center frequency is adjusted to the frequency where the standard deviation is the smallest, which corresponds to the global minimum shown in FIG. 6b. Because the frequency is not varied during the run-up period, there is only a small chance that the selected center frequency $f_c$ will be at a resonant frequency so visible flicker will probably not occur during run-up. However, when the center frequency is varied after having reached steady state, visible flicker will occur at full light output. While the flicker would only last during a few iterations of the frequency sweep, a period of a minute or so, it may nonetheless be disturbing to a user of the lamp.

Another option (illustrated in FIG. 7b) is to begin the frequency sweep and sampling technique during run-up, for example at a delay time $t_o$ of approximately 30 seconds after ignition, again over the entire width of the pre-selected window, $f_q$ to $f_r$. This has the disadvantage that visible flicker will occur both during run-up and after steady state operation has begun. During run-up, the resonant frequencies and thus the global minimum are all rapidly changing as the lamp rapidly heats up. When a frequency sweep of large span is used, the global minimum changes faster than the time it takes to conduct each frequency sweep and sampling iteration. The result is that with large spans, the global minimum cannot quickly be homed-in on until the steady state begins at $t_{steady}$. This option, though still useful, is less attractive than the first option because visible flicker will occur both during run-up and at the beginning of steady-state operation.

A third and more favorable option (FIG. 7c) is to begin the frequency sweep and sampling technique at $t_o$ (see point "A"), but with a span much smaller than the width of window $f_q$ and $f_r$. As compared to a typical span of several kHz for the span $f_q$ to $f_r$ in the above options, the span of $f_q$ to $f_r$ in this third option is about 0.1 kHz. The instantaneous global minimum will likely not be found during the first several iterations. However, each iteration will result in the location of the center frequency closest to the instantaneous frequency at which the global minimum or a local minimum currently exists. This will likely be at either end of the narrow span of the frequency sweep. After several iterations (see point "B"), the frequency sweep and sampling loop homes-in on the instantaneous global minimum. After each successive iteration, the new center frequency closely equals the instantaneous global minimum. Thus, this procedure quickly locates the instantaneous global minimum after several iterations, and tracks the instantaneous global minimum to the steady state. This has the advantage that flicker may occur only during the first several iterations near the beginning of run-up where the lamp only has a low light-output. Thereafter, the procedure will have already found the instantaneous global minimum, and because the span is small and close to the minimum no flicker will occur near the end of run-up and during steady-state. This control option is the most favored because detection of the resonant frequencies during run-up is almost unnoticeable to the human eye.

Steady State Detection

Figure 8:
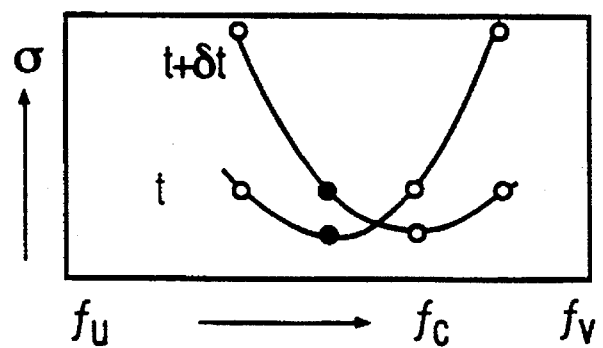
FIG. 8 illustrates the deviations measured around the selected operating frequency in steady state operation.

Once the global minimum and the corresponding preferred operating frequency are determined, it is desirable to continue to check whether the desired operating frequency should be adjusted during the steady-state. If the lamp temperature changes due to changes in the ambient, the speed of sound will change with a corresponding change in the resonant frequencies. Therefore, such changes should be detected and the operating frequency continuously adjusted. This is accomplished by dynamically repeating the frequency sweep and sampling loop previously described with yet a smaller frequency span $f_u$ to $f_v$ (FIG. 8). The smaller span should be selected so that the lamp does not visibly flicker during this steady state detection process, and is typically about 0.1 kHz.

Operating Routine

Figure 9:
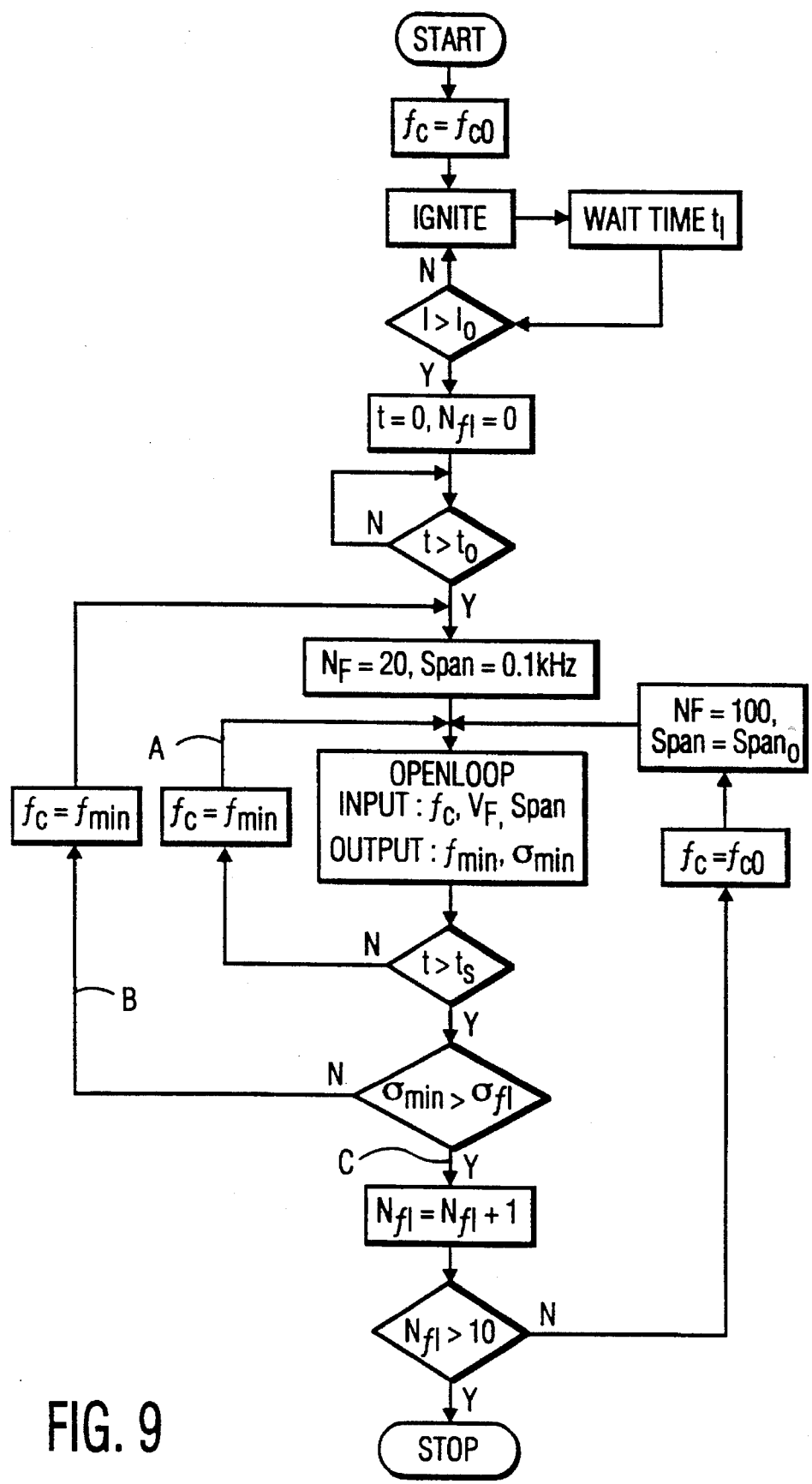
FIG. 9 is a flow chart of a control loop for operating a high pressure discharge lamp.

A flowchart for a routine for operating an HID lamp according to the third control option (FIG. 7c) is shown in FIG. 9. This algorithm finds the minimum flicker and corresponding operating frequency $f_{min}$ in a pre-selected power frequency window ($f_{c0} \pm Span_0/2$). The power frequency interval is pre-selected based on experimental investigation as described above or by the initial step of the lamp controller, to find a window of operating frequencies free of strong resonances for the lamps which are intended to be controlled by the lamp controller.

At the program start, the center frequency $f_c$ is initialized at a ballast design frequency $f_{c0}$. A high voltage is then applied to the lamp to ignite it. After a predetermined time $t_I$, the lamp current is sampled to determine if the lamp has in fact ignited. If the lamp current is below a value $I_0$, the lamp has not ignited and ignition is attempted again. When the current I is greater than $I_0$, the lamp has ignited and the time t and a counter variable, $N_{fl}$, are initialized at O. The lamp is then allowed to run-up at the operating frequency $f_{c0}$ until t is greater than a preselected time $t_o$ near the beginning of run-up. The time $t_o$ is selected to be long enough so that the lamp pressure and temperature is high enough for acoustic resonance to occur. Beginning at time $t_o$, a plurality of frequency sweeps of a preselected span and scan rate are conducted via the Open Loop subroutine (shown in FIG. 3) while the lamp is still in the run-up stage, that is prior to the lamp having reached steady state at time $t_{steady}$, for example at 120s. The inputs to the Open Loop program are the center frequency $f_c$, the frequency span "Span", the number $n_f$ of distinct frequencies sampled, the number $n_G$ of conductivity samples taken at each distinct-frequency $n_F$, the number $n_{IV}$ of samples I and V taken at each sample $G_{jk}$, and the time $\delta t_F$ for obtaining the samples $N_G$ at each frequency. These variables are illustrated in FIG. 2. The outputs are the lowest standard deviation $\sigma_{min}$ of the conductance and the corresponding frequency $f_{min}$. During the run-up period, the frequencies at which acoustic resonance and flicker do not occur are changing as the gas pressure and temperature change. During this stage of control, the center frequency is continuously updated in the direction that the resonance-free frequency is moving. Thus, once the lamp has reached steady state and t>$t_{steady}$, the center frequency $f_c$ has usually already reached the optimum value where weak resonances, and visible flicker do not occur.

While the time t is less than $t_{steady}$, the routine stays in branch "A" of FIG. 9. Once $t_{steady}$ is reached, the center operating frequency $f_c$ is set at $f_{min}$, which as illustrated in FIG. 6b, is the global minimum in the steady state. The routine follows branch "B" if the standard deviation $\sigma_{min}$ at $f_{min}$ is less than $\sigma_{fl}$, which has a value corresponding to that at which visible flicker occurs. If $\sigma_{min}$ is greater than $\sigma_{fl}$, visible flicker is still occurring in the lamp at $f_{min}$ and the global minimum has not been found. The frequency sweep is conducted again via branch "C", but with a greater span equal to the width of the window $f_q$ to fr (Span=$Span_o$) and greater number of frequencies ($n_f$=100) to find the global minimum at which visible flicker does not occur. If, the minimum is found at which no visible flicker occurs, the program enters the steady state detection mode, with the narrower span, via branch "B". If after the first iteration visible flicker occurs, the global scan is repeated until a window free of flicker is found. If the number of iterations $N_{fl}$ in branch C exceeds a preset number, such as 10, the lamp is extinguished.

The following are typical parameters for operating the above routine for a 100 W metal halide lamp: $n_F$=20, $n_G$=20, $n_{IV}$=20, $\delta t_f$=50 ms, $f_{c0}$=23.5 kHz, $Span_0$=3 kHz, $Span_0$=0.1 kHz, $t_f$=10 ms, $I_0$=0.1 A, $t_o$=30 s, $t_{steady}$ =120 s, $\sigma_{fl}$ =0.005 G. It should be noted that the value $\sigma_{fl}$ is a conservative threshold value for the standard deviation of conductance at which flicker will be observed by humans. This can be estimated (see the reference W. F. Schreiber, *Fundamentals of Electronic Imaging Systems*; Springer-Verlag, Berlin (1991) p. 14–16) and can be confirmed by adjusting its value until visible flicker does not occur. The advantage of using conductance is that the signal to noise ratio and sensitivity are sufficiently high that deflection response of the arc can be evaluated at levels below that which can be detected by the human eye. Thus, during steady state, $f_c$ can be continuously tracked by sweeping the frequency and the resulting induced arc deflections can be at levels which are measurable but not visible to the human eye.

Figure 7C:
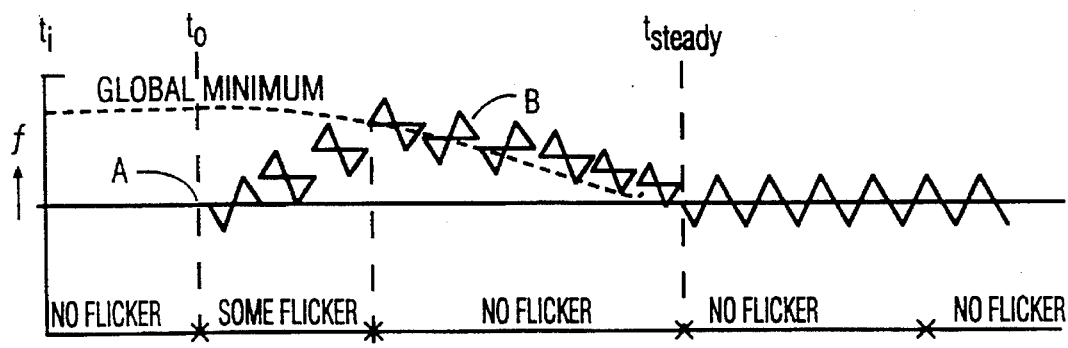
Figure 10A:
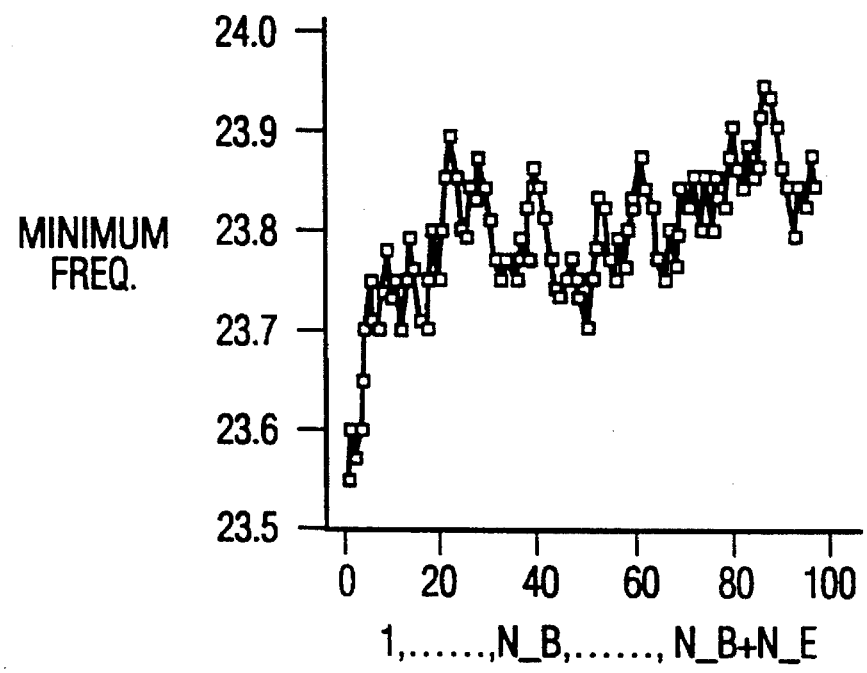
FIGS. 10a; 10b show the output of the routine of FIG. 9 for a 100 W metal halide lamp.
Figure 10B:
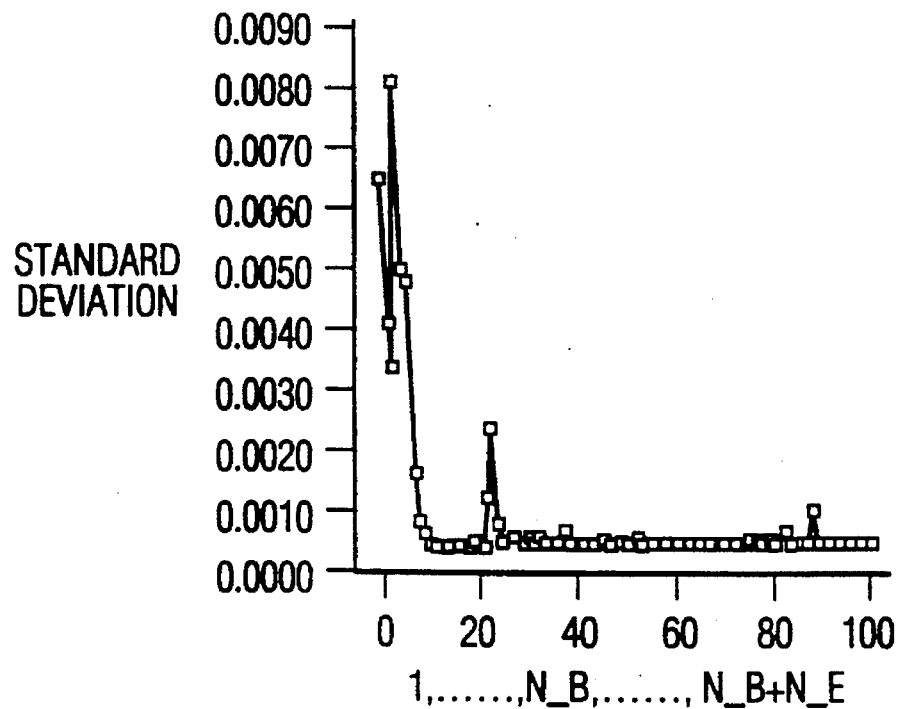

FIGS. 10a, 10b are graphs of the minimum frequency $f_{min}$ and $\sigma_{min}$, respectively, verses $n_f$ for a 100 W metal halide lamp operated according to the flowchart of FIG. 9 (operating according to the control option of FIG. 7(c)) with above-listed parameter values. After only about 6 iterations, the $\sigma_{min}$ was below 0.005, the level at which flicker is visible. Thereafter $\sigma_{min}$ remained very low at about 1/10th of the visible flicker level. Visible flicker occurred only during the first few iterations, which were conducted during the early part of run-up when the lamp was still at a low light output level. Once the lamp reached steady state, branch B continued to monitor and adjust $f_{cmin}$ with no visible flicker.

Alternative Selection Criteria

Figure 11A:
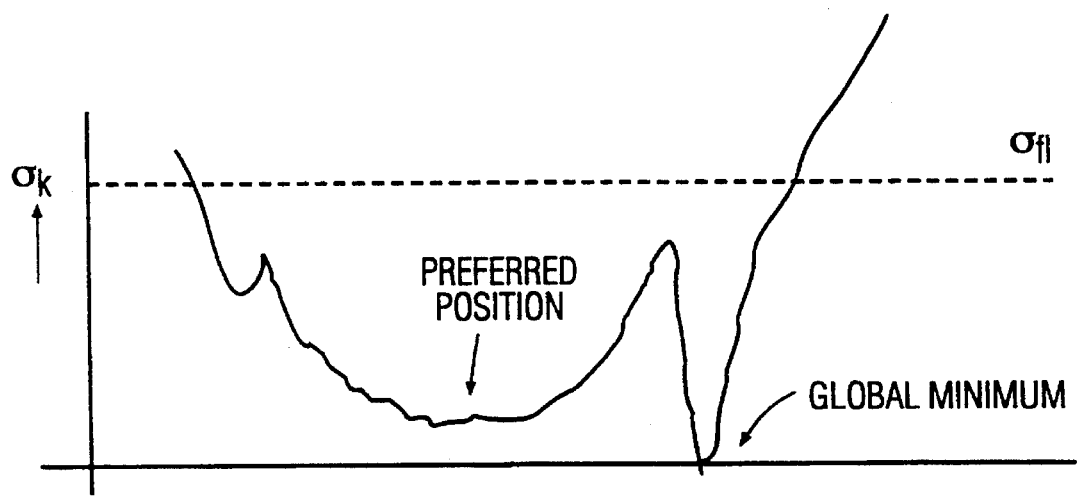
FIG. 11a illustrates a situation where $\overline{\sigma}_k$ has a broad and a narrow minimum both lower than $\sigma_{fi}$.
Figure 11B:
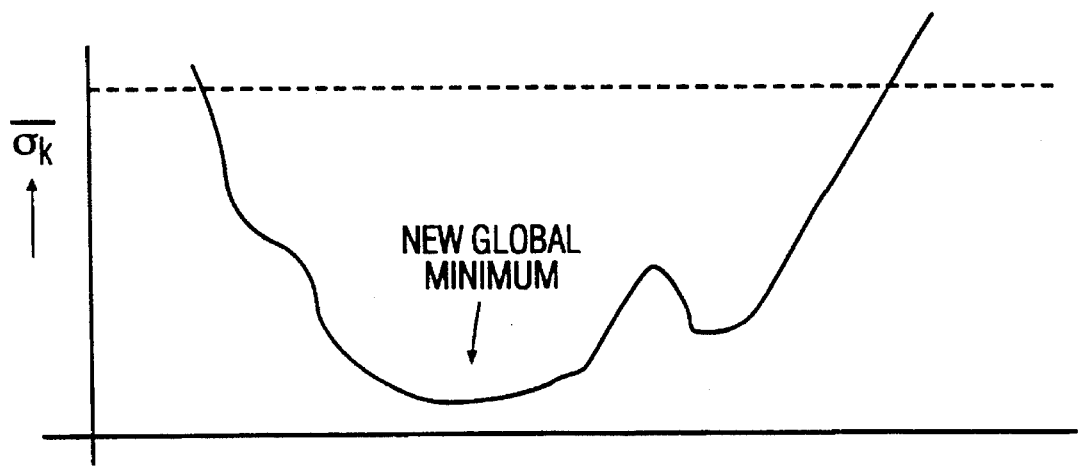
FIG. 11b illustrates the selection of the broader minimum as the new global minimum from the smoothed data $\overline{\sigma}_k$.

In the above embodiments, the frequency was selected as that with the lowest standard deviation. Other criteria can also be applied in selecting a new center frequency after each iteration of the Open Loop routine. For instance, a broad range surrounding the operating frequency is preferred, since operation at a broad minimum would be more stable than at a very narrow minimum. In FIG. 11a, the global minimum is denoted "A" and has a narrower range than the preferred position denoted with "B". At both locations, $\sigma_k$ is less than $\sigma_{fl}$, and no visible flicker occurs. Since the deviation is low enough at the broader minimum so flicker does not occur, the broader minimum may be selected as the center frequency. This can be selected by summing the results $\sigma_k$ of a number of successive frequencies (from k-n to k+n) about each minimum lower than of $\sigma_{fl}$ and obtaining a new series $\bar{\sigma}_k$, thereby smoothing the data. The smoother data $\bar{\sigma}_k$ is shown in FIG. 11(b). The new center frequency equals the allowed frequency with the smallest standard deviation $\bar{\sigma}_k$. The selection of the new center frequency is thus based on the standard deviation of the conductance, and the global minimum detection.

Wall Deflections

It is desirable to turn off the lamp when the discharge arc touches and remains at the wall of the arc tube. Thus, for the relevant lamp type, a $\sigma_{max}$ should be determined for the $\sigma_G$ which corresponds to a deflection which is large enough to cause the arc to touch the wall. During run-up, a broad sweep is conducted if $\sigma>\sigma_{max}$. If in the broad sweep the $\sigma_{max}>\alpha\sigma_{min}$, the arc is no longer at the wall and the minimum can be selected. However, if $\sigma_{max}<\alpha\sigma_{min}$, then the arc is still at the wall and the lamp should be turned off. The constant $\alpha$ is selected to provide the desired statistical confidence, and is typically between two (2) and four (4).

Other Arc Instabilities

Figure 12A:
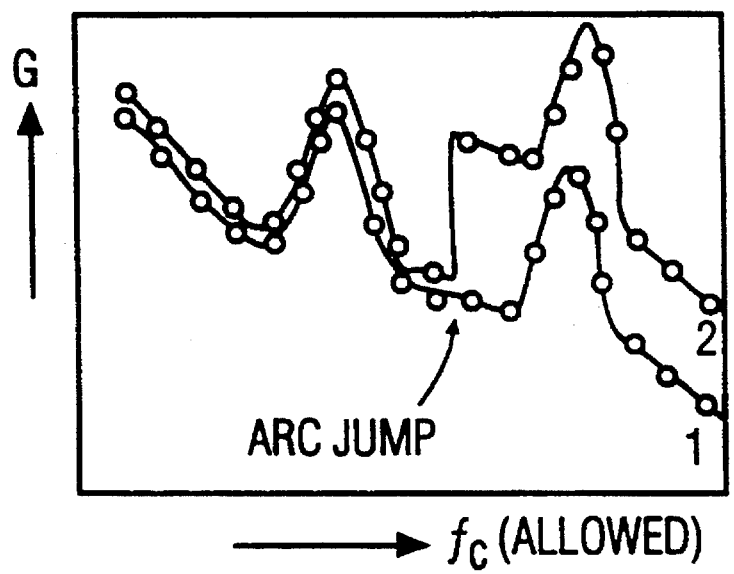
FIGS. 12a; 12b illustrate representative conductivity responses for arc deflections caused by arc jump and sodium flare, respectively.
Figure 12B:
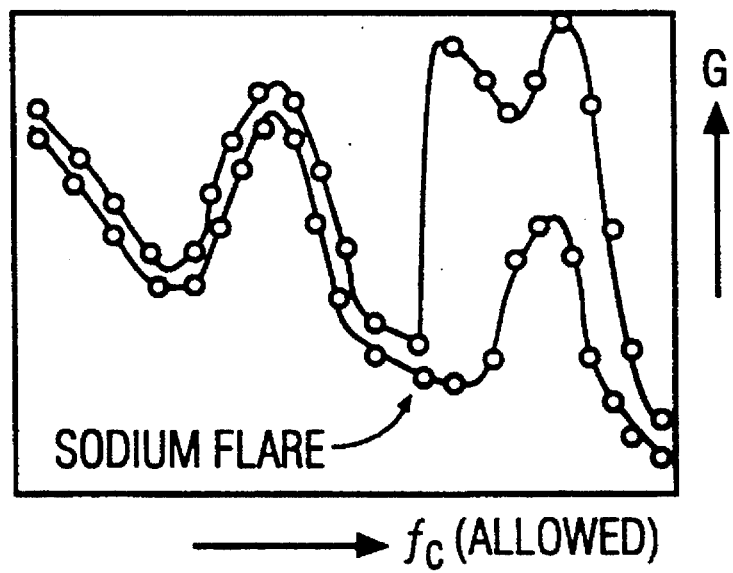

Deflections in the arc may occur for reasons other than acoustic resonance, for example randomly due to arc jumps at the electrode or sodium flares. Representative conductivity responses for these two events are shown in FIGS. 12a and 12b, respectively. Occurrence of such random events will cause a false shift in the center operating frequency if the deflections caused thereby are not ignored. These random event deflections can be distinguished from acoustic resonance deflections by repeating each measurement and by testing if the same result is obtained within a desired statistical confidence level. If the results are not within the desired confidence, the measurements should be repeated again before adjusting the center frequency. For example, the frequency sweep may be conducted twice, each time calculating a standard deviation of all the conductivity samples taken across the whole frequency span. If the $\sigma$ of the second sweep ($\sigma_2$) is within a desired confidence of the $\sigma$ of the first sweep ($\sigma_1$), i.e., $\sigma_2<\beta\sigma_1$, then a random event has not occurred and a new operating frequency can be selected. If $\sigma 2>\beta\sigma_1$, then a random event has occurred and the operating frequency should not be changed. $\beta$ is typically between two (2) and four (4). Those of ordinary skill in the art will appreciate that many other tests could also be used, such as comparing the average, minimum, or maximum of the standard deviation of the conductivity samples measured at each frequency between the two iterations.

Lamp Controller

Figure 13:
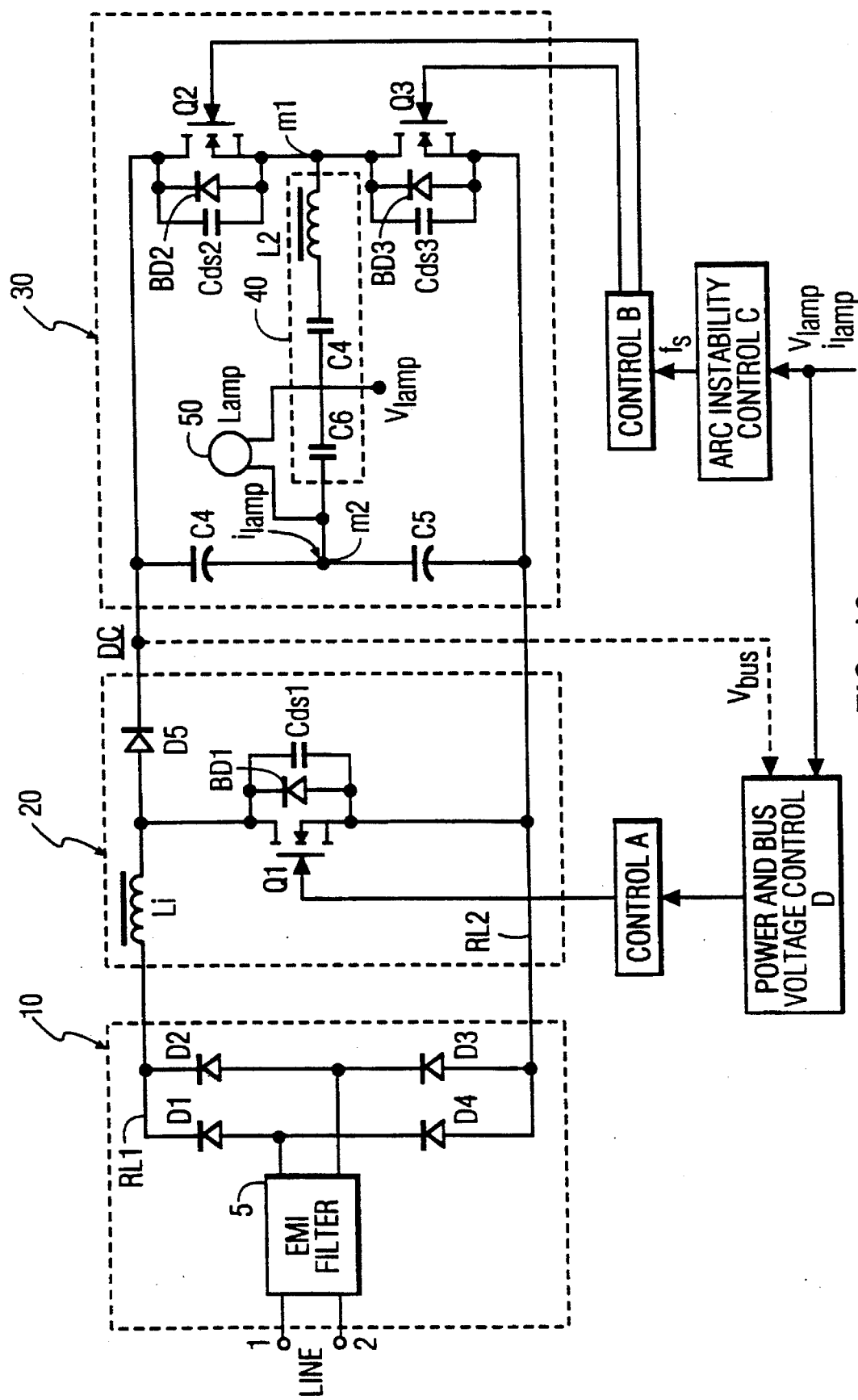
FIG. 13 is a block schematic diagram of an HID lamp controller with resonance detection and frequency control.

FIG. 13 is a schematic\block diagram of an HID lamp controller, or ballast, according to the invention for operating an HID lamp at high frequency and for detecting and avoiding operation at frequencies that cause acoustic resonance/arc instabilities.

The following embodiment illustrates a certain ballast topology and discloses specific numerical parameters selected for a specific application, in particular 100 W metal halide lamps. This embodiment serves as an illustration of one of many possible ballast implementations using the above-described method for arc instability detection and for the bus voltage and lamp power control previously discussed. Accordingly, those of ordinary skill in the art will appreciate that the following embodiment is illustrative only, and not limiting, and the disclosed principles of operation can be used in many different ballast topologies, with different operating parameters.

The ballast includes a DC source 10, a boost converter 20, a high frequency DC-AC square wave inverter 30 and an ignitor 40. The elements 10–40 ignite the lamp and provide a high frequency, substantially sinusoidal AC current to the lamp 50. After lamp ignition, Control C controls the operating frequency of inverter 30 to avoid arc instabilities/acoustic resonance in the HID lamp according to the method described above. Control D controls the boost circuit 20 to limit the bus voltage during lamp ignition phase (since the lamp presents only a small load during this time) to prevent an over-voltage from being applied to the lamp and to elements of the circuit. Control D also controls the boost circuit 20 to maintain constant power to the lamp despite changes made by Control C in the inverter operating frequency to avoid acoustic resonance. Control A operates the boost converter 20 at the boost frequency determined by Control D while Control B operates the inverter 30 at the inverter frequency determined by the Control C.

The DC source 10 includes a pair of input terminals 1,2 for receiving a standard AC power line voltage of 110–120 V. A rectifier consisting of diodes D1–D4 provides a full-wave rectified DC voltage of about 160 V across DC rails RL1, RL2. The DC source 10 may also include an EMI filter 5 for insulating the power lines from interference generated by the lamp controller.

The boost converter 20 boosts and controls the DC voltage across rails RL1, RL2 at a level such that a selected power is provided to the HID lamp 50 via the inverter circuit 30. The boost converter typically boosts the voltage from 160 V to about 380 V. The boost converter also provides power factor correction. The converter 20 includes an inductor L1 having one end connected to the cathodes of diodes D1 and D2 and its other end connected to the anode of diode D5. A switch Q1 is connected between DC rails RL2 and RL1 at a junction between the inductor L1 and the diode D5. The switch Q1 is a mosfet and includes body diode BD1 and parasitic capacitance designated Cds1. The control gate of switch Q1 is connected to control A, which provides a periodic voltage signal to control the switching frequency and duty cycle of the switch Q1 in a manner to be described in further detail. The duty cycle and switching frequency control the current flow throw the inductor L1 so that in conjunction with the capacitors C4 and C5 of the inverter circuit 30 the voltage on the DC rails RL1, RL2 across capacitors C4 and C5 is maintained constant at the desired level. The capacitors C4 and C5 act as an energy storage element to provide constant power to the lamp, even when the line voltage crosses zero.

The inverter circuit 30 is a voltage-fed half-bridge DC-AC inverter with switches Q2, Q3 series connected across the DC rails RL1, RL2. The switches Q2, Q3 are mosfets. The source of switch Q2 is connected to rail RL1, the drain of switch Q2 is connected to the source of switch Q3 and the drain of switch Q3 is connected to rail RL2. Capacitor Cds2 and diode BD2 are the parasitic capacitance and the body diode, respectively, of the switch Q2. Capacitor Cds3 and diode BD3 are similarly the parasitic capacitance and body diode of the mosfet switch Q3. The control gates of switches Q2 and Q3 are connected to control B, which will be described in greater detail. The output of the half-bridge inverter, appearing across points M1, M2, is a high frequency generally square wave signal as is familiar to those skilled in the art.

An LCC network of capacitors C6, C7 and inductor L2 are series connected between a midpoint M1 between the switches Q1 and Q2 and a midpoint M2 between the half-bridge capacitors C4 and C5. The HID lamp 50 is connected in parallel with the capacitor C6. The LCC network provides a waveshaping and current limiting, or ballasting, function to provide a substantially sinusoidal lamp current to the HID lamp 50 from the inverter output present across the midpoints M1–M2.

The LCC network also functions as an ignitor to ignite the lamp upon initial application of power to the controller. The LCC network is tuned to a third harmonic of the initial inverter operating frequency to provide a high starting voltage of about 2500 V selected for this specific application. Starting the lamp at the third harmonic has the advantage of reducing the initial ignition current drawn from the boost converter as compared to conventional first harmonic starting. When the inverter begins operating, an ignition voltage is caused by resonance of the LCC network at the third harmonic of the inverter output at the initial operating frequency. After the lamp starts, the impedance of the lamp is much lower than that of the capacitor C7, so the waveshaping and current limiting is then controlled primarily by the LC network of C6 and L2. Thus, the ignitor uses the variation in the lamp impedance (from about 1M$\Omega$ prior to ignition to about 100 $\Omega$ at steady state) to shift the gain of the circuit including the LCC network and lamp from a gain suitable for providing an ignition voltage to a lower gain suitable for operating the lamp.

Instead of the LCC network shown, other ignitors may used, such as well known pulse ignitors or other resonant ignitors such as an LC or an LLCC network which employ ignition at the first or third harmonic. Additionally, in the LCC network shown, an active frequency shift may be employed by which the inverter operating frequency is set at an initial frequency (generally higher than the steady state frequency) for causing the ignition voltage and then set to a second, different frequency for lamp operation after ignition.

Control B controls the switching frequency and pulse width of the switches Q2 and Q3 in a well known manner to provide the substantially square wave AC inverter voltage across midpoints M1 and M2 at frequencies within a frequency range suitable for operating the lamps intended to be controlled by the ballast. In this instance, the range is between about 20 Khz and 25 Khz, which is the pre-selected operating window, to avoid strong acoustic resonances/arc instabilities for the 100 W metal halide lamps A–E shown in FIG. 5c. In particular, Control B is responsive to a frequency control signal from the Arc Instability Control C to operate the half-bridge at the frequency designated by the Control C.

Figure 14:
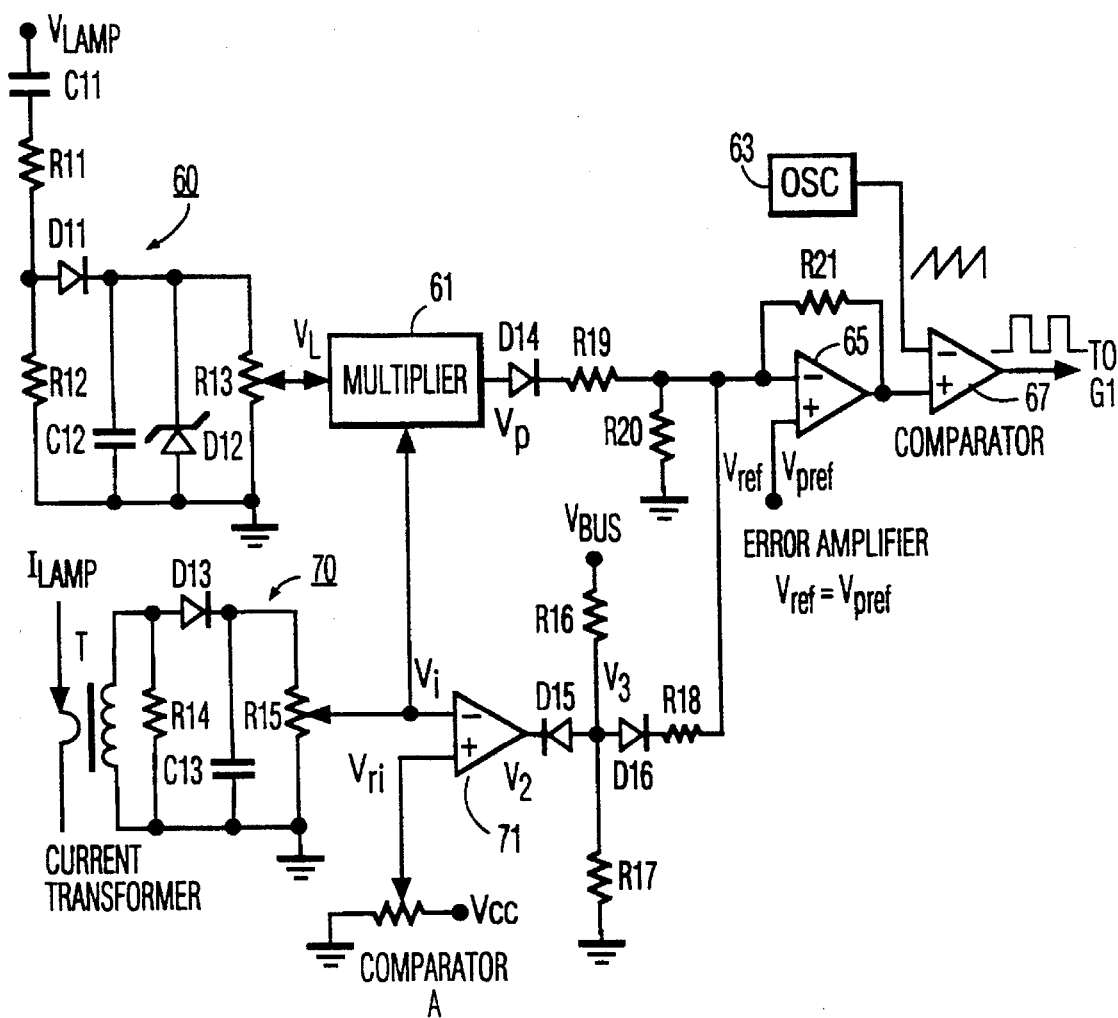
FIG. 14 is a schematic diagram of the power and bus voltage control (Control D) of FIG. 13.
Figure 15:
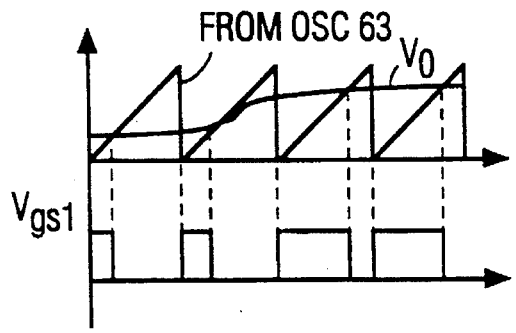
FIG. 15 illustrates the control of the pulse width of the control signal $V_{gs1}$ for the boost switch Q1 to control the bus voltage and the power delivered to the lamp.

The circuitry and operation of Control D and Control A will now be described in greater detail with reference to FIGS. 14 and 15. Control D includes circuits for sensing the lamp voltage and lamp current at locations $V_{Lamp}$ and $I_{Lamp}$ shown in FIG. 13. The lamp voltage is sensed at voltage sensing circuit 60 which includes a voltage divider including resistors R11 and R12 and the capacitor C11. The function of the capacitor C11 is to isolate the DC component between the sensed lamp voltage at point $V_{Lamp}$ and ground. The diode D11 has its anode connected between the resistors R11 and R12 and its cathode connected to one side of the resistor R13. The other side of the resistor R13 is connected to ground. The capacitor C12 and the zener diode D12 are connected in parallel with the resistor R13. The cathode of the zener diode D12 is connected to the cathode of the diode D11. The diodes D11 and D12 form a half-wave rectifier to provide a DC voltage $V_L$ at the resistor R13 representative of the sensed lamp voltage $V_{Lamp}$.

The lamp current is sensed by current sensing circuit 70 which includes current transformer T. Connected in parallel with transformer T are resistor R14, capacitor C13 and resistor R15. The anode of diode D13 is connected to one side of the current transformer T while its cathode is connected to resistor R15. The output of current sensing circuit 70 is a DC voltage $V_i$ which is linearly proportional to the lamp current $i_{Lamp}$. Certain HID lamps have a tendency to draw more power near the end of life than their rated wattage, which can lead to catastrophic lamp failure if this higher power is supplied by the ballast. Since the power control mode limits the power supplied to the lamp, it serves to prevent catastrophic failure. Rather, the lamp will simply fail to operate when the power corresponding to the signal $V_{pref}$ is insufficient to meet the higher power required by the lamp at its end-of-life.

The Control D further includes a multiplier 61 which multiplies the signal $V_L$ representing the lamp voltage with the signal $V_i$ representing the lamp current to obtain signal $V_p$ representing the lamp power. The diode D14 and the resistor R19 are series connected between the output of the multiplier 61 and the inverting input of the error amplifier 65. The non-inverting input of the error amplifier 65 receives a reference signal $V_{pref}$ indicative of the desired operating power for the HID lamp 50 or $V_{ref}$ indicative of the upper limit for the bus voltage. Resistor R20 is connected between a junction between the resistor R19 and the inverting input of the error amplifier 65, and ground. Resistor R21 is connected between the inverting input and the output of the error amplifier 65. The comparator 67 receives the output of the error amplifier at its non-inverting input and a sawtooth waveform output of the oscillator 63 at its inverting input.

The comparator 71 compares the signal $V_i$ received at its inverting input with a signal $V_{ri}$ received at its positive input. The diode D15 has its cathode connected to the output of the comparator 71 and its anode connected to the anode of diode D6. The cathode of diode D16 is connected to one side of the resistor R18, the other side of which is connected to the inverting input of the error amplifier 65. A voltage divider including the resistors R16, R17, is connected between the anodes of diodes D15 and D16. One end of the resistor R16 is connected to the DC rail, or bus, RL1 at the location illustrated in FIG. 13. A voltage $V_3$ representing the bus voltage is therefore present at the midpoint between the resistors R16, R17.

During ignition of the lamp 50, the Control Circuit D operates in a bus voltage control mode. During this time, the lamp is not yet on and has a high impedance. As a result, the load on the boost converter 20 is light and the voltage on the DC rails RL1, RL2 will significantly increase without other measures being taken. After ignition the impedance of the lamp decreases, and the current drawn by the lamp increases, until the lamp reaches steady state. Limits on the bus voltage are needed during ignition and steady state to prevent catastrophic operating conditions, including near lamp end-of-life. Control D senses the bus voltage $V_{bus}$ and feeds it to the control A which adjusts the pulse width of the boost switch Q1 to keep the bus voltage at a predetermined voltage during the ignition phase. Since the lamp has a high impedance, the current through the lamp has a small value which is sensed by the current transformer T and then rectified through the half-wave rectifier D13. The DC voltage $V_i$, which is linearly proportional to the lamp current, is almost zero since there is little lamp current during ignition. In addition, the output of the multiplier 61 is smaller than the reference voltage $V_{ref}$ which results in blocking the diode D14, making the power control loop inactive during this period. The voltage $V_i$ is compared with the voltage $V_{ri}$ through the comparator 71. When $V_i$ is less than $V_{ri}$, as is the case during ignition, the output of comparator 71 is a high voltage $V_2$. As a consequence, diode D15 is reversed biased and the bus voltage control loop is active. Thus, D16 is turned on or off depending on the value of the bus voltage.

When the voltage control loop circuit starts up at lamp ignition, when the lamp presents a very small load, the bus voltage increases rapidly and is sensed through the voltage divider of resistors R16 and R17. While the sensed voltage $V_3$ is less than the reference voltage $V_{ref}$ at start up, the diode $D_{16}$ remains off. The output of the error amplifier, in the initial circuit condition prior to conduction of diode D16, is given by $$V_o = \left(1 + \frac{R_{21}}{R_{20}}\right) V_{ref}$$

The voltage $V_o$ is compared with the saw tooth waveform generated by the oscillator 63 to get the pulse width control for the boost switch Q1, thereby controlling the energy stored in the electrolytic capacitors C4, C5. By design, the duty ratio of the boost stage has a maximum value set at about 0.48. Once the sensed voltage $V_3$ reaches the reference $V_{ref}$, the diode D16 starts conducting. The sensed bus voltage is fed to the inverting terminal of the error amplifier 65 through the resistor R8. The output voltage $V_0$ of the error amplifier 65 is given by $$V_o = \left(\frac{R_{21}}{R_{20}} + \frac{R_{21}}{R_{18}}\right) V_{ref} - \frac{R_{21}}{R_{18}} (V_3 - V_D)$$

where $V_D$ is the forward voltage drop across the diode D16. The voltage $V_o$ and the output voltage of oscillator 63 are fed into the comparator 67 to obtain the pulse width control of the boost switch Q1. FIG. 15 illustrates the voltage V0, the sawtooth waveform from the oscillator 63, and the output waveform of the comparator 67, which is the gate source voltage $V_{gs1}$ controlling the boost switch Q1. The smaller the voltage $V_o$ is, the smaller the pulse width will be of the control signal $V_{gs1}$ controlling the switch Q1. Consequently, the pulse width will decrease when the sensed bus voltage $V_3$ increases. Based on the operation of the boost converter, the bus voltage will be reduced and kept within a preferred range of 450 V for example.

After ignition of the HID lamp 50, the control circuit D switches to a power control mode to control the power to the lamp. Without further measures, the power applied to the lamp will change when the Control C changes the operating frequency of the lamp to control arc instability because the gain of the resonant LCC network or any other ignition topology, and therefore the power delivered to the lamp, varies with the inverter output frequency. Generally speaking, in the power control mode, the lamp current and lamp voltage are sensed and multiplied to obtain the total power in the lamp. The lamp power is compared with a reference power signal with the objective of changing the duty ratio of the boost switch Q1 to regulate the bus voltage across RL1, RL2, which results in adjustment of the power delivered to the lamp.

Once the lamp 50 has ignited, the voltage signal $V_i$ is larger than the reference voltage $V_{ri}$. The comparator 71 outputs a low voltage $V_2$ which leads to the conduction of the diode D15. As a result, the sensed bus voltage $V_{bus}$ is clamped, rendering the bus voltage control loop inactive, and the power control loop becomes active. The sensed lamp voltage $V_L$ and lamp current $V_i$ signals are fed to the multiplier 61 to obtain a power signal $V_p$ of the lamps, which will be compared with the reference power $V_{pref}$ to control the pulse width of the boost switch. If the switching frequency of the half-bridge inverter changes, the power delivered to the lamp will increase or decrease since the voltage gain value for the ignitor is different for different inverter operating frequencies.

A decrease in the power transferred to the lamp will be assumed as an example to illustrate the operation of the power control loop. The sensed lamp power $V_p$ from the multiplier 61 is supplied to the inverting terminal of the error amplifier 65 through the resistor R19 and the diode D14 and then compared with the reference power $V_{pref}$. In the power control mode, the output voltage $V_o$ of the error amplifier 65 is given by $$V_o = \left(1 + \frac{R_{21}}{R_{20}} + \frac{R_{21}}{R_{19}}\right) V_{pref} - (V_1 - V_D)$$

Therefore, $V_0$ will increase when the sensed power $V_p$ decreases. As illustrated in FIG. 15, when the sensed lamp power $V_p$ decreases, $V_0$ increases and the pulse width of $V_{gs1}$ increases. When the pulse width increases, the boost switch remains on for a longer period of time within each cycle, thereby increasing the bus voltage across rails RL1, RL2. As a result of the increase in the bus voltage $V_{bus}$, the power delivered to the lamp increases. This negative feedback keeps the lamp power the same as the reference power set by the signal $V_{pref}$. On the other hand, if the lamp power increases due to a change in the half-bridge switching frequency by the Control C, the sensed power $V_p$ becomes larger, leading to a decrease in the pulse width of the driving signal $V_{gs1}$ for the boost switch Q1. The boost converter will then lower the bus voltage on rails RL1, RL2 until the sensed power equals the reference power value $V_{ref}$.

From the above analysis, it can be seen that control D has two control modes, which are the voltage and power control modes. One objective of the voltage control mode is to clamp the bus voltage during lamp ignition and prior to steady state operation. The bus voltage control can also be used to prevent catastrophic lamp end of life, where the tendency of the ballast is to provide excessive power to the lamp due to the impedance variation with lamp life. The objective of the power control mode is to deliver a constant power to the lamp even with changes in the switching frequency and in the line voltage.

Figure 16:
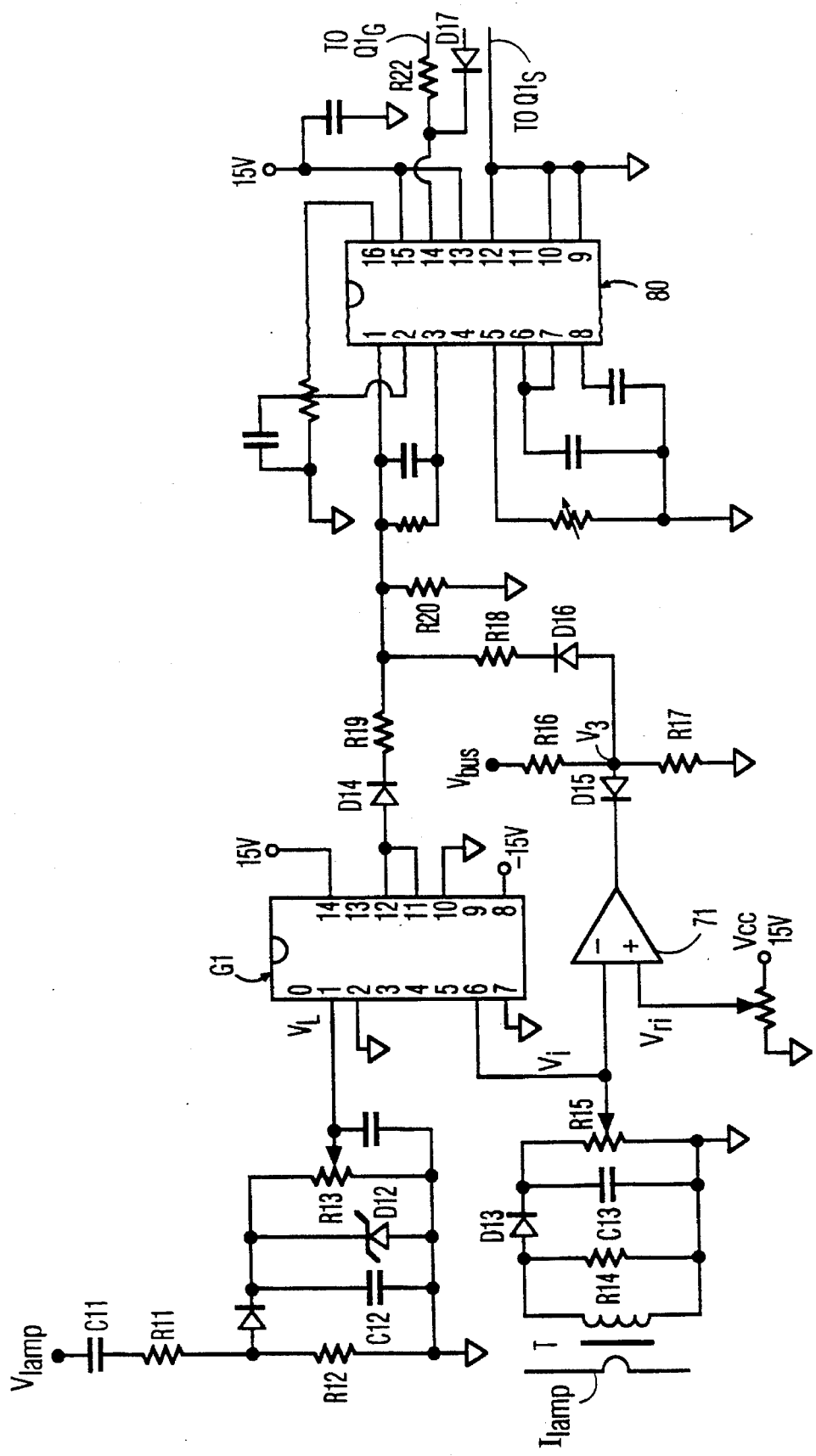
FIG. 16 shows the circuit connections of the IC's embodying the various elements of Control A and Control D.
Figure 18:
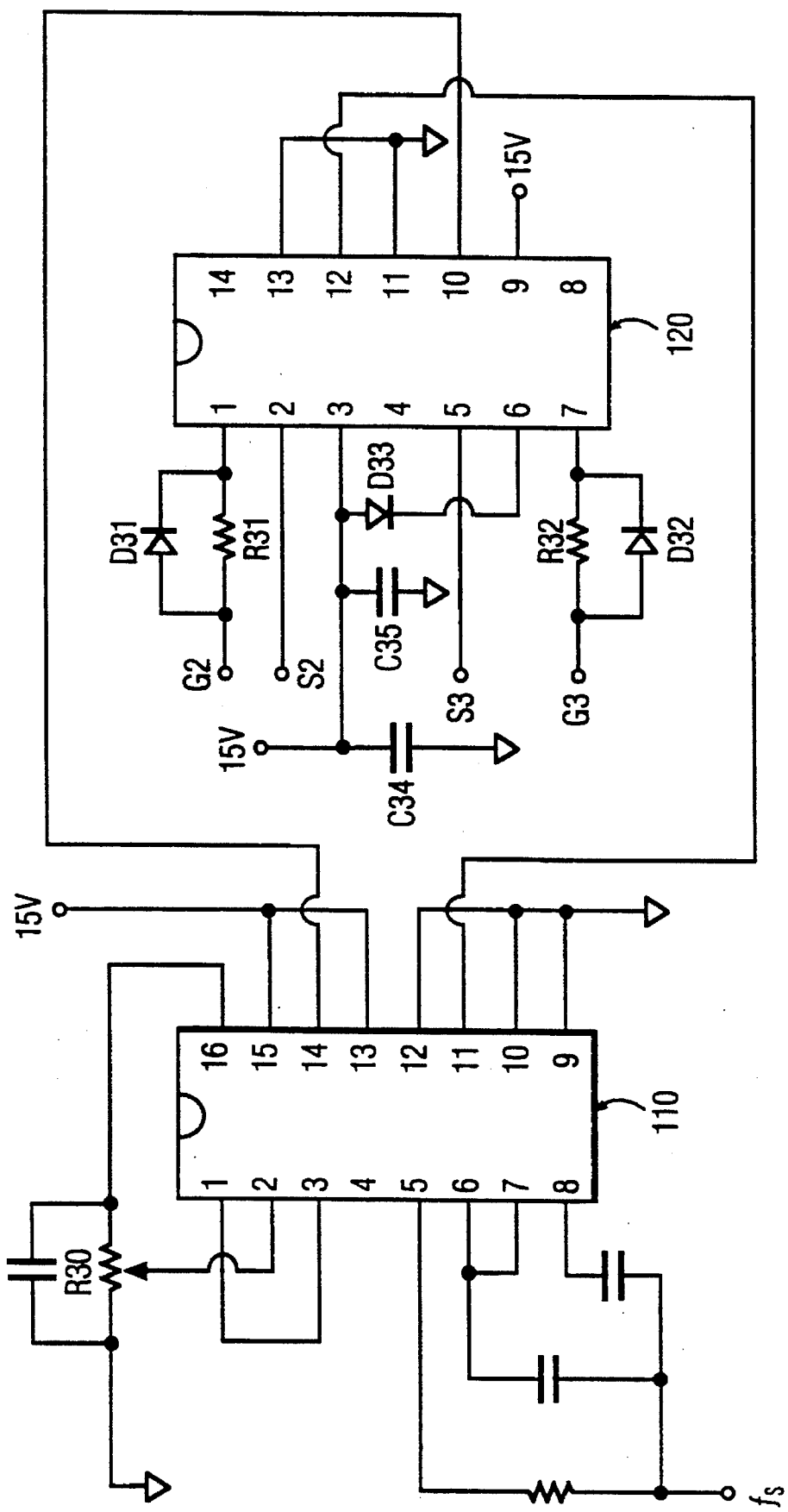
FIG. 18 is schematic diagram of the half-bridge controller (Control B).

FIG. 16 is a circuit diagram for the controls A and D of FIG. 13. Components the same as those discussed in FIG. 14 bear the same reference numerals. The multiplier 61 of FIG. 14 is embodied in a 14 pin IC (model AD534 available from Analog Device Corp.). $V_L$ is input at pin 1 and $V_i$ is input at pin 6. The oscillator 63, error amplifier 65 and the comparator 67 are embodied in a 16 pin high speed PWM controller 80 (model UC 3825 available from Unitrode Corp.). The UC 3825 is optimized for high frequency switched mode power supplies and directly controls the switching of the mosfet Q1. The source of switch Q1 is connected to pins 9, 10 and 12 and to ground. The gate of switch Q1 is connected to pin 14 via the resistor R22. In FIGS. 16 and 18, the pin connections not specifically described herein are shown merely for the sake of completeness and are not necessary for the understanding of the invention. Such connections are specified by the IC manufacturer.

Figure 17:
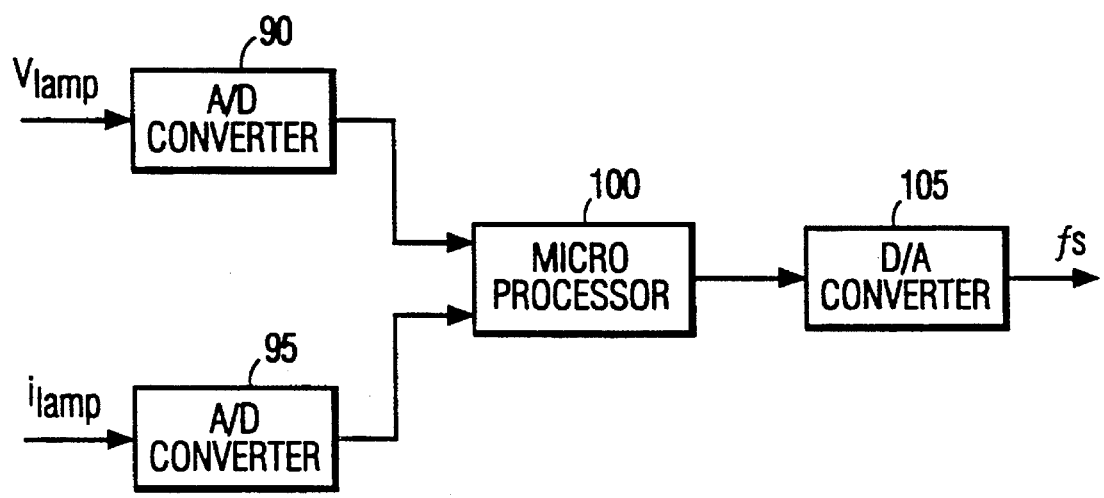
FIG. 17 is a block diagram of Control C for Arc Instability Control.

As shown in FIG. 17, the Control C for Arc Instability Control includes two A/D converters 90, 95 for converting the sensed lamp voltage $V_L$ and lamp current $V_i$ to a respective digital signal. The signals $V_L$ and $V_i$ are tapped from the circuits 60, 70 of FIG. 14. The control C further includes a microprocessor 100 which implements the program of FIG. 9 in software to control the operating frequency of the half-bridge inverter 30. The microprocessor 100 receives the sensed lamp voltage and lamp current from the dual A/D converters and outputs a digital signal which is converted to an analog signal $f_s$ by the A/D converter 105.

The signal $f_s$ represents the instantaneous frequency output by the software program in conducting any of the modes of operation according to the method previously described.

By implementing the program of FIG. 9 in software in the microprocessor 100, the Control C includes means for carrying out each of the method steps hereinbefore described with respect to detection of the frequencies at which acoustic resonance/arc instability occurs and for changing the frequency of the inverter to a new center operating frequency. Thus, for example, with respect to the frequency sweep of FIG. 2, the Control C includes means for varying the operating frequency over a plurality of distinct operating frequencies, for measuring a plurality of samples of an electrical parameter of the lamp at each of the plurality of distinct operating frequencies, and means for calculating, at each of said plurality of operating frequencies, the standard deviation of the samples taken at each frequency, and means for evaluating, for example detecting the smallest standard deviation, to select a new center frequency.

The selection of components for the control C is based on the desired precision and sampling speeds necessary for effectively implementing the program of FIG. 9 and depends on lamp type, physical and chemical properties, lamp power and dimensions. In one implementation, the minimum number of samples for lamp current and voltage to obtain one standard deviation measurement at one frequency was selected as 20. Samples were taken at 100 individual frequencies in each frequency sweep, so a total of 100 times 20, or 2000 samples are taken in each frequency sweep. The sampling speed should be slow enough to allow the arc to react but fast enough to prevent large arc movements. A suitable range for sampling speed is between 50 msec and 100 msec for 100 W metal halide lamps. The minimum precision of the A/D and D/A converters 90,95,105 and of microprocessor 100 was selected to be 0.005 which is satisfied by 8-bit devices (8-bits=$1/256$=0.004). In the implementation shown in FIGS. 13, 14 the A/D converters are an 8-bit, high speed model ADC 0820 available from Linear Technologies. The D/A converter was also 8-bit; model NE 5018 available from Signetics. The microprocessor was an 16 Mhz, 8-bit processor, model 87C550 with 4K of EPROM available from Philips Semiconductors. The software program of FIG. 9 was programmed in the Assembler language. These devices provide a sampling rate of 10 Khz to 20 Khz for the lamp current and voltage with a sampling speed of between 50 msec and 100 msec., which was found to be sufficient for effectively detecting and avoiding acoustic resonance in 100 W metal halide lamps.

Control B use well-known techniques for driving the half-bridge inverter with the exception that it drives the half-bridge inverter at a frequency indicated by the control C rather than at a constant frequency as is usually done. A circuit implementing Control B is illustrated in FIG. 18. The circuit includes IC's 110 and 120. IC 110 is a 16 pin, high speed controller (model UC3825 available from Unitrode Corp.) which serves to receive the frequency designating output signal $f_s$ from the Control C and provide control signals for input to the IC 120. The IC 120 is 14 pin, high voltage, high speed MOS gate driver (model IR 2110 available from International Rectifier). The IR 2110 has both high and low side reference output channels and is especially useful for half-bridge applications since it has internally set dead time control. The IC 120 provides the gate\source drive signals to the mosfet switches Q2, Q3. The output signal of the Control C is input at pins 5 and 6, which serves to control the duty cycle variation.

The output of IC 110 is taken from pins 11 and 14 and are input at pins 12 and 10, respectively, of the IR 2110 (IC 120).

The gate of switch Q2 (FIG. 3B) is connected to pin 1 via the resistor R31. The diode D31 is connected in parallel with the resistor R31 with its cathode connected to pin 1 and serves to prevent a negative bias at this pin. Similarly, the gate of switch Q3 is connected to pin 7 via the parallel arrangement of the resistor R32 and diode D32, which serve the same function as the resistor/diode network connected to pin 1. The source S2 of switch Q2 and the source S3 of switch Q3 are connected to pins 2 and 5, respectively.

The microprocessor may be programmed to include different combinations of the steps herein described and/or use one described option instead of another. For example, the controller may select an operating frequency which occurs at a broad minimum rather than at a narrower, but smaller, minimum or implement the Open loop routine at different points during run-up and steady state, as discussed for example, with respect to FIGS. 5(a)–5(c). Furthermore, the controller\ballast could be implemented in a modular system form with the controller including one or more parts each performing selected functions and outputting signals to other modules. In this context, for example, the modular system could include a ballast with a controller designed to cooperate with a series of control devices, each of which performs a selected combination of the functions described herein.

From the above description, it can be seen that Applicants have discovered certain steps which are universally applicable to gas discharge lamps for detecting and avoiding arc instabilities and which are particularly useful for detecting/ avoiding arc instabilities due to acoustic resonance. These steps may be implemented in many different ballast topologies, including single stage (such as disclosed in U.S. application Ser. No. 08/197,530, filed Feb. 10, 1994) as well as two stage ballasts, and as already discussed, may be employ different ignitors. The control is applicable for all (or a great) frequency range(s), basically from 0 HZ to several MHZ and with no perceived upper limit. Limitations are related to the speed of sampling and processing (which will be overcome by faster processors) and most importantly by ballast (hardware) construction.

It is expected that future ballast topologies and circuit techniques (especially for the ignitor) will render the gain of the inverter more constant across a broader frequency range, allowing a larger frequency sweep range to be implemented and generally obviating the need for the described preselection of a broad frequency window by the designer. This will allow an even greater universality of the control; for example, permitting a universal controller module to be plugged into ballasts optimized for different wattage ranges.

The method makes the ballast quite insensitive to lamp dimensional variations (in production lines), chemical modifications along lamp life, and changes in lamp characteristics during its life. The method allows use of high frequency electronic ballasts to run HID lamps and avoids lamp destruction and catastrophic end of life. This control makes the ballast quite immune to the lamp, since it is smart, universal, general and flexible.

While there have been shown what are considered to be the preferred embodiments of the invention, those of ordinary skill in the art will appreciate that various modifications may be made in the above described method and lamp controller which are within the scope of the appended claims. Accordingly, the specification is illustrative only and not limiting.

I claim:

1. A method of operating a gas discharge lamp, comprising the steps of:

a. operating the gas discharge lamp at a plurality of operating frequencies;

b. sensing and taking a plurality of samples of an electrical lamp parameter at each of said plurality of operating frequencies;

c. calculating a deviation, at each of said plurality of frequencies, of the samples taken at said each frequency; and d. evaluating the calculated deviations and selecting a lamp operating frequency based on the evaluation.

2. A method according to claim 1, wherein said electrical lamp parameter sensed is one of lamp voltage, lamp current, lamp conductance and lamp impedance.

3. A method according to claim 1, wherein the deviation calculated is the standard deviation.

4. A method according to claim 1, wherein the deviations are evaluated to determine the lowest deviation and the operating frequency is selected as the frequency corresponding to the lowest deviation.

5. A method according to claim 1, wherein the lamp is operated at said plurality of frequencies by conducting a sweep of frequencies about a center frequency, said sweep including a portion with a set of frequencies wherein the frequencies are increasing and a portion including the same set of frequencies wherein the frequencies are decreasing.

6. A method according to claim 1, wherein said steps (a)–(d) are conducted during a run-up stage of lamp operation, between ignition of the lamp and steady state operation, in which run-up stage the frequencies at which acoustic resonance occurs rapidly changes.

7. A method according to claim 6, wherein said steps (a)–(d) are conducted both during the lamp run-up stage and during steady state operation of the lamp, and wherein the frequencies at which the lamp is operated during the run-up stage have a first span, and the frequencies at which the lamp is operated at after having reached the steady state have a span smaller than said first span.

8. A method according to claim 7, wherein the span of said frequencies during steady state operation are selected so that the lamp has no flicker visible to a human.

9. A method according to claim 1, wherein the lamp is turned off if, after a predetermined number of iterations of steps (a)–(d), the lowest deviation detected is above a prescribed level.

10. A method according to claim 1, wherein said steps (a)–(b) are conducted twice consecutively and steps (c)–(d) are conducted only if the difference between the respective sets of samples measured in said two iterations are within a prescribed confidence level.

11. A method according to claim 10, wherein a respective standard deviation $\sigma_1$ and $\sigma_2$ is calculated for the samples of the first and second iterations and said prescribed level is $\sigma_2 > \beta\sigma_1$, where $\beta$ is a constant selected for the desired statistical confidence level.

12. A method according to claim 1, wherein said electrical parameter sensed is lamp conductance.

13. A method according to claim 3, wherein the deviation calculated is the standard deviation.

14. A method according to claim 13, wherein the lamp is operated at said plurality of frequencies by conducting a sweep of frequencies about a center frequency, said sweep including a portion with a set of frequencies wherein the frequencies are increasing and a portion including the same set of frequencies wherein the frequencies are decreasing.

15. A method according to claim 14, wherein said steps (a)–(d) are conducted during a run-up stage of lamp operation, between ignition of the lamp and steady state operation, in which run-up stage the frequencies at which acoustic resonance occurs rapidly changes.

16. A method according to claim 15, wherein said steps (a)–(d) are conducted both during the lamp run-up stage and during steady state operation of the lamp, and wherein the frequencies at which the lamp is operated during the run-up stage have a first span, and the frequencies at which the lamp is operated at after having reached the steady state have a span smaller than said first span.

17. A method according to claim 16, wherein the span of said frequencies during steady state operation are selected so that the lamp has no flicker visible to a human.

18. A method according to claim 17, wherein the lamp is turned off if, after a predetermined number of iterations of steps (a)–(d), the lowest deviation detected is above a prescribed level.

19. A method of electrically detecting arc instability in a gas discharge lamp, comprising:

taking a plurality of samples of an electrical parameter of the lamp; and evaluating the deviation in the samples of the electrical parameter.

20. A method according to claim 19, wherein samples are taken at each of a plurality of frequencies.

21. An apparatus for detecting deflections in the discharge arc of a gas discharge lamp, said apparatus comprising:

means for measuring a plurality of samples of an electrical parameter of a gas discharge lamp;

means for calculating the deviation of the measured samples; and means for comparing the deviation to a preselected level.

22. An apparatus according to claim 21, wherein said means for calculating calculates the standard deviation.

23. An apparatus according to claim 21, further comprising means for outputting a first signal if the deviation is above the preselected level and a second, different signal if the deviation is below the preselected level.

24. An apparatus according to claim 23, wherein the preselected level corresponds to a threshold in the deviation where the arc deflections appear as flicker visible to the human eye.

25. An apparatus according to claim 21, further comprising means for extinguishing the lamp if the deviation is above a prescribed level corresponding to arc deflections which would damage the discharge lamp.

26. A lamp controller for operating a high pressure gas discharge lamp, comprising:

ballasting means for operating the gas discharge lamp over a first range of operating frequencies; and control means for controlling the operating frequency of said ballasting means, said control means including:

means for varying the operating frequency over a plurality of distinct operating frequencies within said first range of operating frequencies;

means for measuring a plurality of samples of an electrical parameter of the lamp at each of said plurality of operating frequencies;

means for calculating, at each of said plurality of operating frequencies, the deviation in the plurality of samples taken at said each frequency; and means for evaluating the calculated deviations and for adjusting the operating frequency of the ballast means based on said evaluation.

27. A lamp controller according to claim 26, wherein said means for evaluating the deviation calculates the standard deviation of the samples taken at each of said plurality of frequencies.

28. A lamp controller according to claim 26, wherein said electrical lamp parameter measured by said measuring means is one of lamp voltage, lamp current, lamp conductance and lamp impedance.

29. A lamp controller according to claim 26, wherein said electrical parameter measured by said measuring means is lamp conductance.

30. A lamp controller according to claim 26, wherein said means for varying the frequency includes means for conducting a sweep of frequencies about a center frequency, said sweep including a portion with a set of frequencies wherein the frequencies are increasing and a portion including the same set of frequencies wherein the frequencies are decreasing.

31. A lamp controller according to claim 26, wherein said evaluating means determines the frequency at which the deviation in the samples of the electrical parameter is the smallest and adjusts the operating frequency of said ballasting means to the frequency with the smallest deviation.

32. A lamp controller according to claim 26, wherein said control means is operative during a run-up stage of lamp operation, between ignition of the lamp and steady state operation, in which run-up stage the frequencies at which acoustic resonance occurs rapidly changes.

33. A lamp controller according to claim 26, wherein said control means is operative both during the lamp run-up stage and during steady state operation of the lamp, and wherein the frequencies at which the lamp is operated during the run-up stage have a first span, and the frequencies at which the lamp is operated at after having reached the steady state have a span smaller than said first span.

34. A lamp controller according to claim 33, wherein said span during steady state operation is selected so that the lamp has no flicker visible to a human.

35. A lamp controller according to claim 26, wherein said lamp controller includes means for extinguishing the lamp if the lowest deviation detected is above a prescribed level.

36. A lamp controller according to claim 26, wherein said lamp controller adjusts the operating frequency only if the difference between the respective set of deviations measured in two iterations are within a prescribed level.

\* \* \* \* \*